US010615016B2

(12) United States Patent
Eiler et al.

(10) Patent No.: US 10,615,016 B2
(45) Date of Patent: Apr. 7, 2020

(54) DETERMINING ISOTOPE RATIOS USING MASS SPECTROMETRY

(71) Applicants: Thermo Fisher Scientific (Bremen) GMBH, Bremen (DE); California Institute of Technology, Pasadena, CA (US)

(72) Inventors: John Eiler, Sierra Madre, CA (US); Alexander Makarov, Bremen (DE); Johannes Schwieters, Ganderkesee (DE); Dieter Juchelka, Bremen (DE); Jens Griep-Raming, Ganderkesee (DE)

(73) Assignees: Thermo Fisher Scientific (Bremen) GMBH, Bremen (DE); California Institute of Technology, Pasadena, CA (US)

( * ) Notice: Subject to any disclaimer, the term of this patent is extended or adjusted under 35 U.S.C. 154(b) by 0 days.

(21) Appl. No.: 16/123,705

(22) Filed: Sep. 6, 2018

(65) Prior Publication Data

US 2019/0074169 A1 Mar. 7, 2019

Related U.S. Application Data

(63) Continuation-in-part of application No. 15/697,644, filed on Sep. 7, 2017, now Pat. No. 10,199,207.

(51) Int. Cl.

*H01J 49/02* (2006.01)
*G01N 21/27* (2006.01)

(Continued)

(52) U.S. Cl.

CPC ...... *H01J 49/0036* (2013.01); *H01J 49/0009* (2013.01); *H01J 49/0027* (2013.01);

(Continued)

(58) Field of Classification Search

CPC .... H01J 49/0036; H01J 49/0009; H01J 49/02; H01J 49/022; G01N 33/6851; G01N 15/0266; G01N 21/274; G01N 33/6848

(Continued)

(56) References Cited

U.S. PATENT DOCUMENTS 5,121,338 A * 6/1992 Lodder ................ G01N 21/359 250/339.06
5,545,895 A * 8/1996 Wright ................ G01N 21/274 250/252.1

(Continued)

FOREIGN PATENT DOCUMENTS

WO WO 2016/083074 A1 6/2016

OTHER PUBLICATIONS

European Extended Search Report dated Jan. 28, 2019 for European Patent Application No. 18193114.8, 6 pages.

(Continued)

*Primary Examiner* — David A Vanore
(74) *Attorney, Agent, or Firm* — Sage Patent Group

(57) ABSTRACT

The present inventive concepts relate to determining an isotope ratio using mass spectrometry. Mass spectra of ions are obtained by generating ions, guiding the ions through a device having a mass transfer function that varies with ion current, providing at least some of the ions to a mass analyser and obtaining a mass spectrum of the ions and determining the ion current of the ions provided to the mass analyser. An isotope ratio of the ions is determined for each mass spectrum. Using the determined isotope ratio and determined ion current for each mass spectrum, a calibration relationship is determined that characterises the variation of the determined isotope ratios and the measured ion currents across the mass spectra. Then, a measured isotope ratio obtained at a determined ion current is adjusted using the (Continued)

calibration relationship to adjust the measured isotope ratio to an adjusted isotope ratio corresponding to a selected ion current.

20 Claims, 12 Drawing Sheets

(51) Int. Cl.
*H01J 49/00* (2006.01)
*H01J 49/42* (2006.01)

(52) U.S. Cl.
CPC .......... *H01J 49/022* (2013.01); *H01J 49/421* (2013.01); *H01J 49/425* (2013.01); *H01J 49/4265* (2013.01)

(58) Field of Classification Search
USPC ....... 250/282, 288, 281, 252.1, 283; 702/30, 702/85, 23
See application file for complete search history.

(56) References Cited

U.S. PATENT DOCUMENTS

| | | | | |
|---|---|---|---|---|
| 6,188,064 | B1 * | 2/2001 | Koster | H01J 49/0036 250/281 |
| 6,590,203 | B2 | 7/2003 | Kato | |
| 6,831,271 | B1 | 12/2004 | Guevremont | |
| 7,577,538 | B2 * | 8/2009 | Wang | G06K 9/0057 250/281 |
| 7,829,846 | B2 * | 11/2010 | Hashimoto | H01J 49/0036 250/281 |
| 8,440,962 | B2 * | 5/2013 | Le Blanc | H01J 49/4295 250/282 |
| 9,159,538 | B1 * | 10/2015 | McClure | H01J 49/0036 |
| 9,453,828 | B2 * | 9/2016 | Corbett | G01N 33/1886 |
| 10,115,577 | B1 * | 10/2018 | Eiler | G01N 30/7206 |
| 10,199,207 | B1 * | 2/2019 | Eiler | H01J 49/4265 |
| 2002/0027195 | A1 | 3/2002 | Kato | |
| 2006/0249672 | A1 * | 11/2006 | Grimm, II | H01J 49/165 250/288 |
| 2008/0052011 | A1 * | 2/2008 | Wang | H01J 49/0036 702/27 |
| 2008/0176334 | A1 * | 7/2008 | Baranov | G01N 33/532 436/80 |
| 2009/0302210 | A1 | 12/2009 | Castro-Perez | |
| 2010/0114498 | A1 * | 5/2010 | Park | H01J 49/0036 702/19 |
| 2012/0112056 | A1 | 5/2012 | Brucker | |
| 2012/0264155 | A1 * | 10/2012 | Frandsen | G01N 33/6851 435/23 |
| 2012/0309027 | A1 * | 12/2012 | Anderson | G01N 33/6851 435/7.21 |
| 2013/0037707 | A1 * | 2/2013 | Lamberti | G01N 33/241 250/282 |
| 2013/0103337 | A1 * | 4/2013 | Eiler | G16C 20/20 702/86 |
| 2014/0097338 | A1 * | 4/2014 | Eiler | H01J 49/0009 250/282 |
| 2014/0138538 | A1 * | 5/2014 | Hieftje | H01J 49/40 250/282 |
| 2014/0361159 | A1 * | 12/2014 | Pfaff | H01J 49/0036 250/282 |
| 2017/0047217 | A1 | 2/2017 | Radke et al. | |
| 2017/0200596 | A1 * | 7/2017 | Makarov | H01J 49/0422 |
| 2018/0011990 | A1 * | 1/2018 | Moseley | H01J 49/0036 |
| 2019/0074169 | A1 * | 3/2019 | Eiler | H01J 49/0036 |

OTHER PUBLICATIONS

Thermo Scientific, "Thermo Scientific Q Exactive GC Orbitrap GC-MS/MS System," retrieved from the Internet: URL: https://www.anchem.pl/media/files/Q-Exactive-Orbitrap-spec.pdf; retrieved on Jan. 9, 2019, dated Jan. 1, 2015, 4 pages.

Eiler et al., "The Orbitrap as a gateway to high-dimensionality studies of molecular isotopic structure," retrieved from the Internet: URL: https://scholarcommons.usf.edu/cgi/viewcontent.cgi?refere=&httpsredir=1&article=1033&context=clumped_isotope; retrieved on Jan. 2, 2019, dated Jan. 9, 2016, 1 page.

European Intention to Grant dated Oct. 2, 2019 for European Patent Application No. 18193114.8, 7 pages.

* cited by examiner

DETERMINING ISOTOPE RATIOS USING MASS SPECTROMETRY

CROSS-REFERENCE TO RELATED APPLICATION

This application is a continuation-in-part of U.S. patent application Ser. No. 15/697,644 filed on Sep. 7, 2017, which issued as U.S. Pat. No. 10,199,207 on Feb. 5, 2019, the disclosure and content of which is incorporated by reference herein in its entirety.

FIELD

The present inventive concepts relate to measuring isotope ratios using a mass spectrometer. In particular, the present inventive concepts relate to reducing or minimising space charge effects that may otherwise adversely affect the isotope ratio measurements.

BACKGROUND

Mass spectrometers may be used to measure isotope ratios, for example in carbon or oxygen containing compounds. This may be done, for example, to ascertain a geochemical origin of a sample. The compounds themselves, or their fragments, or their reaction products (e.g. their combustion or oxidation products) are ionised and the masses and the abundances of the resulting ions are measured. In this way, the ratio of isotopes present in the compounds such as $^{13}C/^{12}C$ or $^{18}O/^{16}O$ may be determined. This may be performed using solid, gaseous or liquid samples containing the compounds to be analysed, which are typically subject to a separation process prior to ionisation, such as by gas chromatography or liquid chromatography.

Accurate and precise isotope measurements are usually determined on magnetic sector mass spectrometers. However, recently it has been shown that Orbitrap™ mass spectrometers are capable of measuring precise and accurate isotope ratios (John Eiler, presentation at Clumped Isotope Workshop, January 2016; John Eiler et al. Poster at ASMS 2016 conference).

The guiding, and where present, confinement of ions produced in this process leads to space charge effects that have been found to affect the measured isotope ratios. That is, space charge effects affect the fractionation of the ions from the sample leading to different relative abundances of the isotopes being introduced into the mass spectrometer from their true relative abundances present in the compound. This leads to different isotope ratios being measured from one sample to the next due to variations in the experimental conditions.

A known technique for measuring isotope ratios is known as sample/reference bracketing and involves mass spectrometer measurements of ions generated from both a sample to be analysed and also from a reference with a known isotope ratio in an alternating manner (i.e. sample measurements are bracketed by reference measurements before and after). Space charge effects can lead to erroneous isotope ratio determinations, even for the known reference. As the space charge effects can vary from one fill of an ion storage device of the mass spectrometer with ions to the next fill, even the sample/reference bracketing technique cannot be used to correct these effects on the isotope ratio measured for the sample to be analysed. The present inventive concepts seek to address the problems of inaccuracies introduced into isotope ratio measurements because of space charge effects.

SUMMARY

The space charge effects described above can occur within at least one ion optical device located upstream of a mass analyser of a mass spectrometer, typically located between the ion source and the mass analyser. The inventive concepts are useful with mass spectrometers in which ions generated by an ion source are passed to the mass analyser via at least one ion optical device having an ion transmission function that has a space charge dependent mass bias. For example, a quadrupole mass filter has been found to have such a transmission function. The mass bias means a difference between an observed isotope ratio of the ions and the true isotope ratio that varies with ion current. In terms of a mass filter, a mass bias can therefore be the difference between the isotope ratio of the ions transmitted by the mass filter and the isotope ratio of the ions as they enter the mass filter.

It is important to have a measure of the ion current through the at least one ion optical device having an ion transmission function that has a space charge dependent mass bias when measuring the isotope ratio. The measured "ion current" parameter can be a parameter that is representative of this ion current or the actual ion current. The representative parameter in some embodiments can be, for example, one of: the ion current at the ion source, an ion current through an ion optical device downstream of the ion source, such as a quadrupole mass filter or multipole (especially the at least one ion optical device having the space charge dependent mass bias), or a total ion current measured from a mass spectrum of the ions that may be collected by the mass analyser. Thus, measuring the ion current includes obtaining some measure of the ion current, not necessarily a direct or exact measure of the ion current.

Then the inventive concepts involve adjusting a measured isotope ratio based on a calibration relationship that relates ion current to isotope ratio. The inventive concepts preferably involve adjusting a measured isotope ratio using the calibration relationship to provide an adjusted measured isotope ratio at an adjusted ion current, i.e. adjusting the measured isotope ratio to an adjusted isotope ratio that would have been obtained had the adjusted ion current been used.

Accordingly, and from a first aspect, the present inventive concepts reside in a method of determining an isotope ratio of ions from a source (sample) of ions using mass spectrometry to obtain mass spectra of ions. Obtaining each mass spectrum comprises (i) generating ions from a first source of ions, (ii) guiding the generated ions through a device having a mass transfer function that varies with ion current, (iii) providing at least some of the ions to a mass analyser, (iv) using the mass analyser to obtain the mass spectrum of the ions provided to the mass analyser, and (v) determining the ion current of the ions provided to the mass analyser. Mass spectra are obtained in this way for different measured ion currents, for example either by controlling the ion current to vary or by allowing the ion current to drift or to change randomly.

Generating ions from the first source of ions may comprise generating ions from the same supply of atoms or molecules, for example a gas sample, for instance a source gas filling a chamber or a source gas provided from a gas bottle (which may be used to replenish a chamber), or a liquid sample. The first source of ions may comprise multiple batches of the same molecules or atoms, for example multiple containers such as gas bottles providing the same gas, or multiple containers holding liquid samples obtained from the same source. The batches of the first source of ions should all have the same composition and hence substantially the same isotope ratio.

Guiding the generated ions through a device having a mass transfer function that varies with ion current may include storing or trapping the ions in the device. The storing or trapping the ions in the device may typically be followed by transmitting the ions out of the device.

The method further comprises determining an isotope ratio of ions provided to the mass analyser from each mass spectrum obtained in this way. Then, the method comprises using the isotope ratio and ion current determined for each mass spectrum to determine a calibration relationship that characterises the variation of the determined isotope ratios and the measured ion currents across the mass spectra. The method then comprises adjusting a measured isotope ratio obtained at a determined ion current by using the calibration relationship to adjust the measured isotope ratio to an adjusted isotope ratio corresponding to a selected ion current.

The measured isotope ratio that is adjusted may be one of the isotope ratios determined in the preceding method steps, or may be another measured isotope ratio, for example an isotope ratio determined either earlier or later, but that is preferably determined in the same way, i.e. using method steps (i) to (v) above.

The ions may be a first sample of ions, and an isotope ratio may be measured for a second sample of ions, different to the first sample of ions, in a similar manner to the first sample of ions. The isotope ratio measured for the second sample of ions may then be adjusted, as described immediately above.

Hence, the method may further comprise generating ions from a second source of ions (second sample); guiding the ions generated from the second source of ions through the device having the mass transfer function that varies with ion current; providing at least some of the ions generated from the second source of ions to the mass analyser; using the mass analyser to obtain a mass spectrum of the ions provided to the mass analyser that were generated from the second source of ions; determining the ion current of the ions provided to the mass analyser that were generated from the second source of ions; and determining an isotope ratio of ions provided to the mass analyser that were generated from the second source of ions from the mass spectrum. Generating ions from the second source of ions may comprise generating ions from the same supply of atoms or molecules, for example a gas sample, for instance a source gas filling a chamber or a source gas provided from a gas bottle (which may be used to replenish a chamber), or a liquid sample. The second source of ions may comprise multiple batches of the same molecules or atoms, for example multiple containers such as gas bottles providing the same gas, or multiple containers holding liquid samples obtained from the same source. The batches of the second source of ions should all have the same composition and hence substantially the same isotope ratio. The second source of ions may or may not have the same composition as the first source, and hence may or may not have the same isotope ratio.

Guiding the ions generated from the second source through a device having a mass transfer function that varies with ion current may include storing or trapping the ions in the device. The storing or trapping the ions in the device may typically be followed by transmitting the ions out of the device.

The adjusted ion current for the first sample of ions can be the same ion current as an ion current for which an isotope ratio has been measured for the second sample of ions.

Thus, the measured isotope ratio for the second sample of ions may also be adjusted using the calibration relationship to provide an adjusted measured isotope ratio at an adjusted ion current for the second sample of ions. The adjusted ion current for the first sample of ions is preferably the same as the measured or adjusted ion current for the second sample of ions. In alternative embodiments, the adjusted ion current for the first sample of ions and the adjusted ion current for the second sample of ions can be an arbitrary ion current, for example an arbitrary ion current selected from within the range spanned by the measured ion currents.

The first sample of ions can be ions of unknown isotope ratio, i.e. analyte ions. The second sample of ions can be ions of known isotope ratio, i.e. reference ions. In this way, in having the adjusted ion current for the first sample of ions the same as the measured or adjusted ion current for the second sample of ions, the space charge related mass bias effects are effectively removed as between the analyte ions and reference ions.

In another embodiment, the first sample of ions may be the reference ions and the second sample of ions may be the analyte ions. In this way, the ion current for the reference ions can be adjusted to the measured or an adjusted ion current of the analyte ions.

Based on the known isotope ratio of the reference ions, the measured or adjusted isotope ratio for the reference ions can be used to calibrate the adjusted isotope ratio of the analyte ions. Thus, the present inventive concepts extend known techniques that see isotope ratio measurements of reference ions used to calibrate isotope ratio measurements of analyte ions. In some embodiments, the deviation between the measured or adjusted isotope ratio for the reference ions and the known isotope ratio for the reference ions can be determined (e.g. as a fractional value), which can be used as calibration factor, and then the measured or adjusted isotope ratio for the analyte ions can be calibrated (corrected) by applying the calibration factor (for example by multiplying it by the calibration factor). By means of the present inventive concepts, the ion current used for the measured or adjusted isotope ratio for the analyte ions corresponds to the ion current at which the calibration factor is derived for the reference ions.

In some embodiments, it may be possible to have the adjusted ion current for the first sample of ions and the adjusted ion current for the second sample of ions to be an ideal ion current at which according to the calibration relationship the measured isotope ratio for the reference ions would be the same as the known isotope ratio. In such embodiments, no further correction may be needed to the adjusted isotope ratio for the analyte ions.

The calibration relationship preferably provides a gradient relating change in isotope ratio with change in ion current. Thus, correcting the measured isotope ratio may comprise adjusting an isotope ratio corresponding to a first ion current by using the gradient to provide an adjusted measured isotope ratio corresponding to a second, adjusted ion current. In a preferred step, the inventive concepts comprise measuring an isotope ratio of ions at each of a plurality of measured ion currents, thereby allowing the calibration relationship that relates change in ion current to change in isotope ratio to be determined. Measuring the isotope ratio of ions at each of a plurality of ion currents in this way means measuring the isotope ratio of ions from the same sample composition, i.e. having the same true isotope ratio but differing measured isotope ratios due to the dependence of the mass bias effect with ion current. The measuring an isotope ratio of ions at each of a plurality of ion currents may comprise measuring the isotope ratio at a plurality of ion currents for the first sample of ions or the second sample of ions described above or both, e.g. for the analyte ions and/or the reference ions.

Accordingly, the method may comprise selecting the determined ion current of the ions from the second source of ions as the selected ion current, and wherein the step of adjusting the measured isotope ratio comprises adjusting the measured isotope ratio or ratios obtained for the ions from the first source of ions by using the calibration relationship to adjust the measured isotope ratio or ratios to an adjusted isotope ratio corresponding to the selected ion current. For example, one of the measured isotope ratios may be selected for correction.

In the above examples, the first source of ions may be a sample with an unknown isotope ratio (i.e. an "analyte") and the second source of ions may be a reference with a known isotope ratio. In this case, the calibration relationship is determined for the sample, and the isotope ratio of the sample is adjusted to an isotope ratio corresponding to the ion current used when measuring the reference, or to an isotope ratio corresponding to an adjusted ion current used for the reference.

Alternatively, the first source of ions may be a reference with a known isotope ratio and the second source of ions may be a sample with an unknown isotope ratio. In this case, the calibration relationship is determined for the reference, and the isotope ratio of the reference is adjusted to an isotope ratio corresponding to the ion current used when measuring the sample, or to an isotope ratio corresponding to an adjusted ion current used for the sample. As the ion current used to correct the isotope ratio may be arbitrary, a further correction may be required. For example, a corrected isotope ratio of the sample may be provided by using a calibration factor based on the deviation of the adjusted reference isotope ratio and the known (true) value of the reference isotope ratio.

In a further example where the first source of ions may be a reference with a known isotope ratio and the second source of ions may be a sample with an unknown isotope ratio, the method may comprise using the calibration relationship to determine the ion current corresponding to the known isotope ratio of the reference. That is, the ion current that would have produced the known isotope ratio is determined. Then, this ion current is selected as the selected ion current for the step of adjusting the measured isotope ratio. In this example, the measured isotope ratio of the sample is adjusted to the selected ion current, thereby providing a corrected isotope ratio for the sample. In this example, there is then no need to further calibrate using the reference to obtain a corrected isotope ratio for the sample.

In other examples, a calibration relationship may be determined for the ions from both the first and second source of ions. Hence, the method may further comprise obtaining mass spectra of ions from a second source of ions. Obtaining each mass spectrum may comprise further steps of generating ions from the ions from the second source of ions, guiding the ions generated from the ions from the second source of ions through the device having the mass transfer function that varies with ion current, providing at least some of the ions generated from the ions from the second source of ions to the mass analyser, using the mass analyser to obtain a mass spectrum of the ions provided to the mass analyser from the ions from the second source of ions, determining the ion current of the ions provided to the mass analyser from the ions from the second source of ions, and determining the isotope ratio of ions provided to the mass analyser from the ions from the second source of ions from the mass spectrum. Generating ions from the second source of ions may comprise generating ions from the same supply of atoms or molecules, for example a gas sample, for instance a source gas filling a chamber or a source gas provided from a gas bottle (which may be used to replenish a chamber), or a liquid sample. The second source of ions may comprise multiple batches of the same molecules or atoms, for example multiple containers such as gas bottles providing the same gas, or multiple containers holding liquid samples obtained from the same source. The batches of the second source of ions should all have the same composition and hence substantially the same isotope ratio. The second source of ions may or may not have the same composition as the first source, and hence may or may not have the same isotope ratio. Guiding the ions generated from the second source through a device having a mass transfer function that varies with ion current may include storing or trapping the ions in the device. The storing or trapping the ions in the device may typically be followed by transmitting the ions out of the device. Then, the method may comprise using the determined isotope ratio and determined ion current for each mass spectrum obtained from the ions from the second source of ions to determine a sample calibration relationship that characterises the variation of the determined isotope ratios and the measured ion currents across the mass spectra obtained from the ions from the second source of ions. This is effectively repeating the steps performed on ions from the first ion source on ions from the second ion source.

Then, the method may comprise adjusting a measured isotope ratio or ratios of the ions from the second source of ions by using the calibration relationship determined for the ions from the second source of ions to adjust the measured isotope ratio or ratios to an adjusted isotope ratio for the ions from the second source of ions corresponding to the selected ion current that used when adjusting the measured isotope ratio or ratios of the ions from the first source of ions. Hence, adjusted isotope ratios are obtained for both the ions from the first and second source of ions that are adjusted to the same ion current. This then allows a calibration to be made, for example by providing a corrected isotope ratio of the sample by using a calibration factor based on the deviation of the adjusted reference isotope ratio and the known (true) value of the reference isotope ratio.

The step of determining the ion current of the ions provided to the mass analyser set out in any of the preceding paragraphs may comprise determining the total number of ions provided to the mass analyser from the mass spectrum. For example, the time during which the ions were provided to the mass analyser may be determined, and the ion current may then be calculated from the determined total number of ions and the determined time.

Alternatively, or in combination, the step of determining the ion current of the ions provided to the mass analyser set out in any of the preceding paragraphs may comprise determining the ion current using a charge collection device separate from the mass analyser. This may comprise providing ions to the charge collection device by repeating the step of generating ions and then providing the at least some ions to the charge collection device. Optionally, this may be done while the mass analyser is collecting a mass spectrum.

For example, after providing ions to the mass analyser, more ions may be generated and guided to the charge collection device instead.

The device having a mass transfer function that varies with ion current set out in any of the preceding paragraphs may comprise a mass filter, optionally a quadrupole mass filter. Then, step (iii) described above that comprises providing at least some of the ions to a mass analyser may comprise providing ions with masses (or m/z ratios) within a mass selection window of the mass filter. The step of guiding ions through the mass filter may include guiding isotopes of interest for which the isotope ratio is to be determined, setting a mass selection window of the mass filter to be centred around the masses of the isotopes of interest and to include the isotopes of interest, and allowing ions with masses within the mass selection window to exit the mass filter such that the at least some of the ions provided to the mass analyser are the ions allowed to exit the mass filter. The mass selection window may be set such that the centre mass value of the window is the average mass of the two isotopes of interest.

Optionally, any of the above methods may comprise controlling the mass spectrometer to provide a selected ion current such that the step of guiding the generated ions through the device having a mass transfer function that varies with ion current and/or the step of providing at least some of the ions to the mass analyser is performed using the selected ion current. In this way a preferred ion current may be selected for which space charge effects are reduced.

From a further aspect, the present inventive concepts reside in a method of determining an isotope ratio of ions using mass spectrometry comprising generating ions from a source of ions, and guiding the generated ions through a mass filter, optionally a quadrupole mass filter, having a mass transfer function that varies with ion current by setting a mass selection window of the mass filter to be centred around and to include the masses of isotopes of interest for which the isotope ratio is to be determined, introducing ions including the isotopes of interest into the mass filter, and allowing ions with masses within the mass selection window to exit the mass filter. The method further comprises providing at least some of the ions with masses within the mass selection window to a mass analyser, using the mass analyser to obtain a mass spectrum of the ions provided to the mass analyser, and determining an isotope ratio of ions provided to the mass analyser from the mass spectrum.

Generating ions from the source of ions may comprise generating ions from the same supply of atoms or molecules, for example a gas sample, for instance a source gas filling a chamber or a source gas provided from a gas bottle (which may be used to replenish a chamber), or a liquid sample. The source of ions may comprise multiple batches of the same molecules or atoms, for example multiple containers such as gas bottles providing the same gas, or multiple containers holding liquid samples obtained from the same source. The batches of the source of ions should all have the same composition and hence substantially the same isotope ratio.

Guiding the generated ions through a device having a mass transfer function that varies with ion current may include storing or trapping the ions in the device. The storing or trapping the ions in the device may typically be followed by transmitting the ions out of the device.

Optionally, the mass selection window is set to be centred around the isotopes of interest such that both isotopes sit at approximately the same position relative to the edges of the mass transfer function of the mass filter. The mass selection window may be set to be centred around the middle of the masses of the isotopes of interest. The centre of the mass selection window may be set midway between the masses of the two isotopes of interest.

The present inventive concepts also reside in a computer programmed to perform any of the above methods. The computer may be a controller operable to control a mass spectrometer. The computer may include a processing circuit coupled to an associated memory containing a computer program comprising computer program instructions that, when executed by the computer, cause the computer to control the mass spectrometer to perform any of the above methods.

The present inventive concepts also reside in a mass spectrometer comprising a device having a mass transfer function that varies with ion current, a mass analyser coupled to the device and a computer coupled to the mass analyser and programmed to perform any of the above methods. The computer may be a controller operable to control a mass spectrometer.

The present inventive concepts also reside in a computer program comprising computer program instructions that, when executed by a computer, cause the computer to perform any of the above methods, and a computer readable storage medium containing computer program instructions that, when executed by a computer, cause the computer to perform any of the above methods.

BRIEF DESCRIPTION OF THE DRAWINGS

In order that the inventive concepts can be more readily understood, reference will now be made, by way of example only, to the accompanying drawings in which.

DETAILED DESCRIPTION OF EMBODIMENTS

Figure 1A:
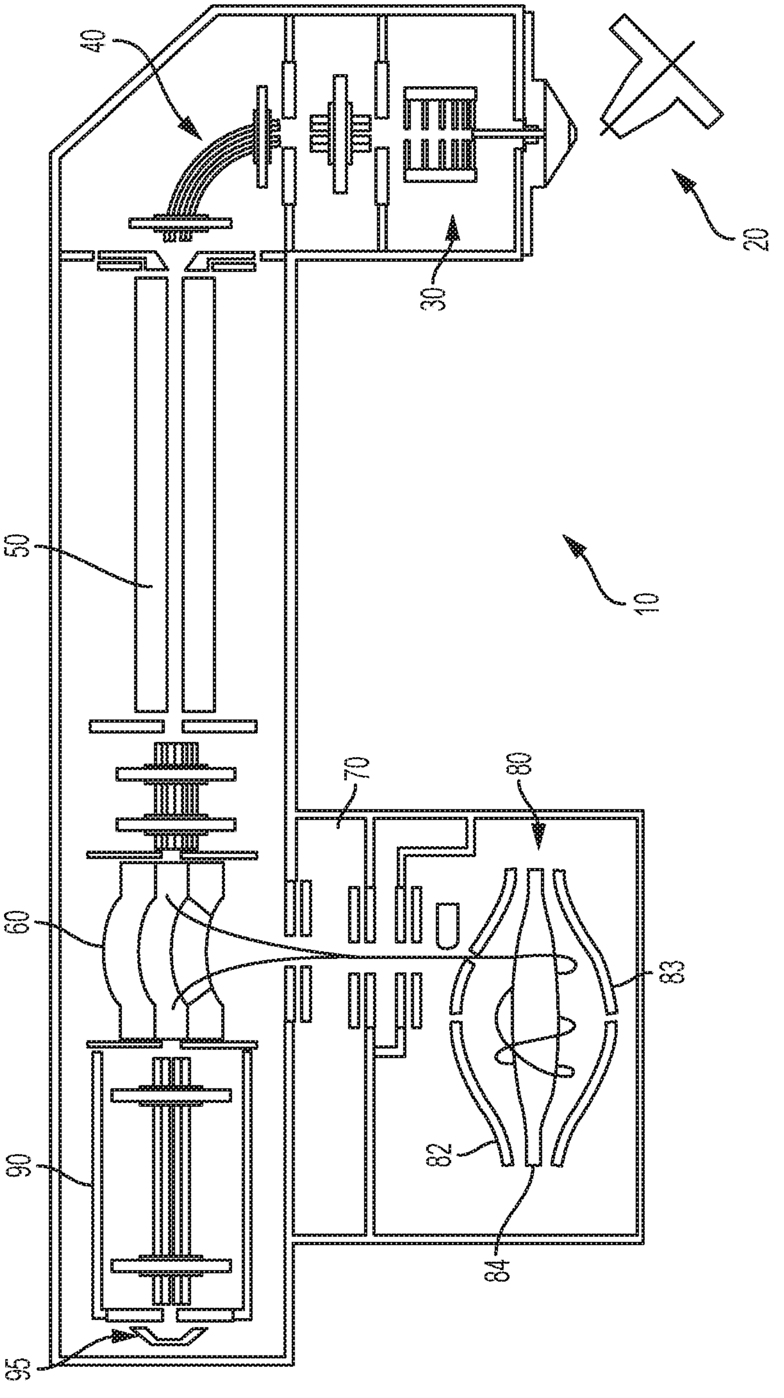
FIGS. 1A and 1B show schematic representations of two typical mass spectrometers.

To provide background to the present inventive concepts, a typical mass spectrometer used to measure isotope ratios will first be explained. FIG. 1A shows a schematic arrangement of a Q Exactive™ hybrid quadrupole Orbitrap™ mass spectrometer 10 which may be used to measure isotope ratios.

The mass spectrometer 10 includes an ion source 20 which generates gas-phase ions. These pass through an ion source block 30 into an RF transmission device 40, which cools ions by collisions with gas. The cooled ions then enter a quadrupole mass filter 50, which is operated with a mass selection window set such that the mass filter 50 extracts only those ions within a desired mass selection window that contains the m/z ratios of interest (i.e. a window that contains the isotopes of interest). Ions with masses falling within the mass selection window then proceed into a linear trap 60 (typically, a C-trap), which stores ions in a trapping volume through application of an RF potential to a set of rods (typically quadrupole, hexapole or octapole). Alternatively, the linear trap 60 may be operated to guide ions rather than to trap ions.

The mass spectrometer also comprises a higher energy collision cell (HCD) cell 90 and a charge detection device 95. The HCD cell 90 may be used for collision-induced dissociation of ions. That is, ions may be passed from the linear trap 60 to the HCD cell 90 where they are fragmented by collision-induced dissociation. The fragmented ions may then be passed back to the linear trap 60 where they are stored or guided elsewhere. The charge detection device 95 is an "ion collector" which sits behind the HCD cell 90 and may be used to measure ions, for example with a Faraday cup. When a measure of ion current is needed, ions may be directed from the linear trap 60 and guided through the HCD cell 90 (with voltages on the HCD cell end electrodes set to transmit ions through it) and thus onto the charge collection device 95 located behind.

Ions, whether they are unfragmented or fragmented, may be stored in the linear trap 60 by holding the ions in a potential well, the bottom of which may be located adjacent to an exit electrode of the linear trap 60. Alternatively the ions may merely pass through the linear trap 60. While space charge effects will affect ions everywhere, these effects are felt most strongly where there is a greater ion flux. Hence, the effects are pronounced within the ion beam as it travels through the mass spectrometer 10, including while travelling through the mass filter 50 and linear trap 60. When ions are stored in the linear trap 60, these ions are particularly affected by the space charge effects.

Ions exit the linear trap 60 orthogonally into a lens arrangement 70, for example by switching off the RF trapping voltage and applying a DC pulse to one or more electrodes of the linear trap 60. Ions pass through the lens arrangement 70 along a line that is curved to avoid gas carry-over, and into an electrostatic trap 80 (also known as a mass analyser). In FIG. 1A, the mass analyser 80 is the so-called "Orbitrap"™ type, which contains a split outer electrode 82, 83 and an inner electrode 84.

The ions arrive at the entrance to the mass analyser 80 as a sequence of short, energetic packets, each packet comprising ions of a similar m/z ratio.

The ions enter the mass analyser 80 as coherent bunches and are squeezed towards the central electrode 84. The ions are then trapped in an electrostatic field such that they oscillate along the central electrode 84 with the frequencies depending on their m/z ratios. Image currents are detected by the first outer electrode 82 and the second outer electrode 83, providing first harmonic transient signal and second harmonic transient signal respectively. These two signals are then processed by a differential amplifier and provide a transient image current signal (herein referred to as the transient).

Therefore, the transient comprises a superposition of one or more periodic signals (or harmonic spectral components). Each periodic signal corresponds to the oscillation of a respective coherent packet of ions within the mass analyser with a respective characteristic frequency determined by the mass-to charge (m/z) ratio of the ions. In this way, ions corresponding to the different isotopes of interest may be detected at the same time. Fourier transform processing of the transient signal enables the frequencies, and in turn the m/z ratio, of the ions to be determined and a mass spectrum obtained. The total number of ions provided to the mass analyser 80 may also be found, from which the ion current may be determined.

Further description of Orbitrap-type mass spectrometers may be found in commonly assigned WO-A-02/078046, the entire contents of which are incorporated herein by reference. It will be appreciated that the mass spectrometer 10 outlined above serves merely as an example as to how the mass spectrum may be generated. The embodiments of the inventive concepts presented below may use any suitable mass spectrum produced by any mass spectrometer 10. In particular whilst the mass spectrometer 10 described above is an Orbitrap™ mass spectrometer 10, which is an example of a mass spectrometer 10 that uses an orbital trapping electrostatic trap, the embodiments of the inventive concepts described below are not limited to such a mass spectrometer 10.

The Orbitrap™ mass spectrometer 10 is suitable for interfacing to a gas chromatography or liquid chromatography system. The ion source 20 shown in FIG. 1A may be, for example, an electrospray ion source suitable for interfacing to a liquid chromatography system.

Figure 1B:
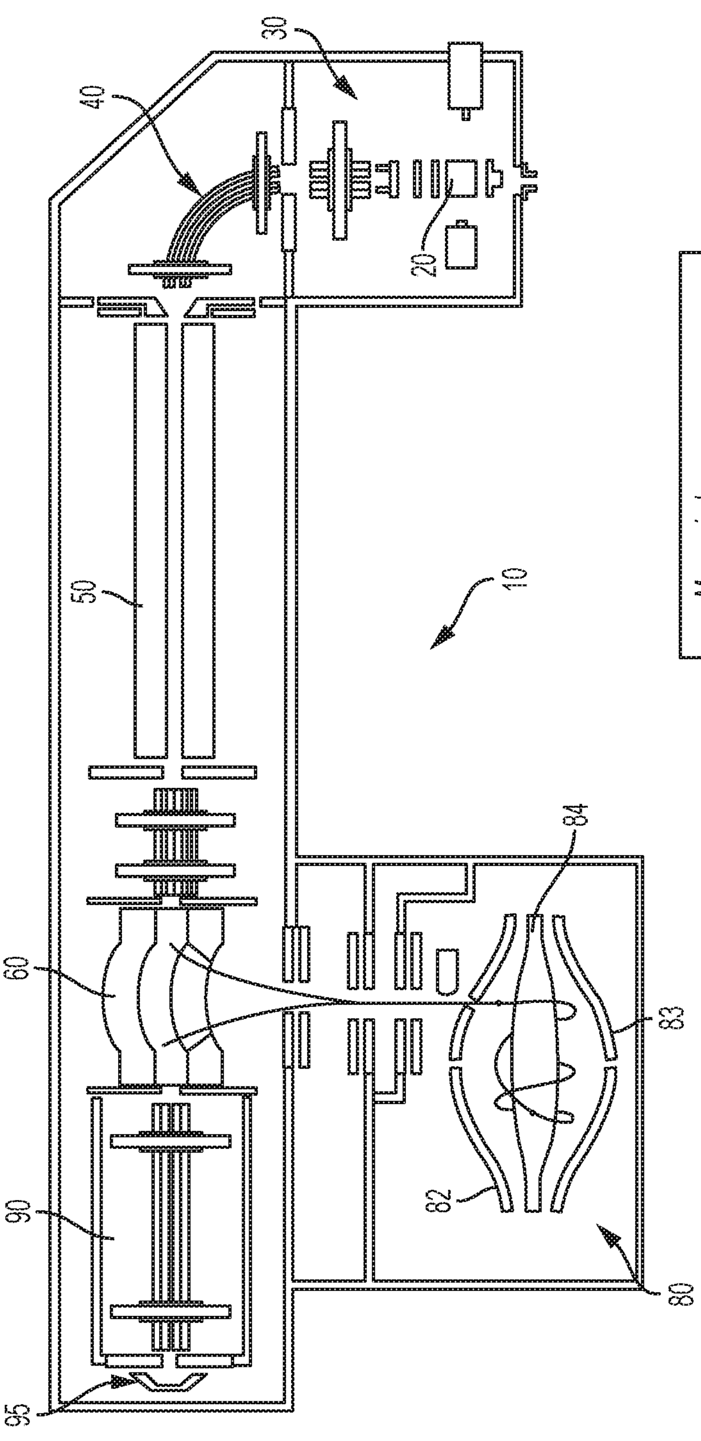

In another preferred set-up, a Q Exactive™ GC gas chromatography mass spectrometer 10 as shown in FIG. 1B, is connected to a Thermo Scientific™ ConFlo IV sample referencing device to which sample and reference gases are connected. The output capillary of the ConFlo IV device is connected to the ion source 20 of the mass spectrometer 10 by means of a gas chromatography transfer line. In this setup it is possible to switch between different samples and reference gases, as well as diluting the samples with Helium. Sample gases with an unknown exact isotopic composition and reference gases of different known isotopic compositions can then be used to perform the experiments. Samples are measured with alternating switching between samples and a reference gas (the so-called sample/reference bracketing described above). Instrumental drifts over the course of several minutes to hours can be detected on the reference gas measurements and sample measurements can be corrected accordingly. Still other sample introduction configurations can be used with the present inventive concepts. For example, the experiment may comprise eluting peaks from a gas chromatography or capturing eluted peaks and slowly releasing them, or sampling vapour evolved from small volumes containing a semi-volatile liquid or solid.

Figure 2:
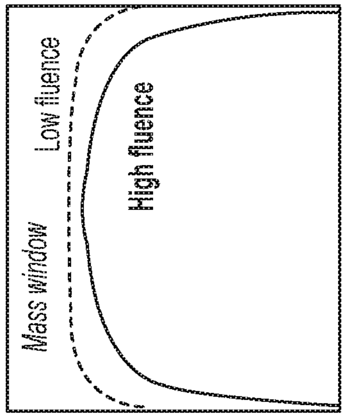
FIG. 2 shows a mass transmission function for a typical mass filter.

As noted above, the mass filter 50 is operated according to a mass selection window. Namely, upper and lower limits are set for the masses that the mass filter 50 allows to pass, such that the mass filter 50 acts as a bandpass filter. As shown in FIG. 2, the transmission function of the mass filter 50 is approximately rectangular, but not exactly rectangular. Ions with masses close to the edges of the mass selection window get discriminated, i.e. they have reduced transmission. In addition, the transmission function may not have a flat top, but exhibit distinct features differing from even transmission, e.g. caused by parametric resonances of the multipoles used. Looking at very precise isotope ratios, the discrimination effect becomes significant even if the ions are away from the edges by two atomic mass units or more. The mass selection window shape is influenced by the ion flux passing through the mass filter 50, as shown in FIG. 2. As the beam size is approximately constant, the ion flux is related to ion current, i.e. the higher the ion current the higher the ion flux. At low ion currents (e.g. upper curve), the transmission function more closely approximates a rectangular shape and has sharper edges. At higher ion currents (e.g. lower curve), the shape of the transmission function becomes more rounded at the edges.

Whilst not being bound by any theory, the reasons for this distortion of the transmission window shape might lie not only in the operation of the mass filter 50 itself, but also in the preceding ion optics, especially if the optics include an RF transmission device 40 like that described above that uses collisional cooling with low speed of ion transport. This inadvertently results in higher space charge densities and hence increased emittance of the ion beam as seen at the entrance to the mass filter 50. Generally, mass filters 50 with ion energies of few eV are more susceptible to this effect as compared to, for example, high-energy selectors like magnetic sector mass filters. These increased space charge effects then also give rise to worse space charge effects in the linear trap 60.

Figure 3A:
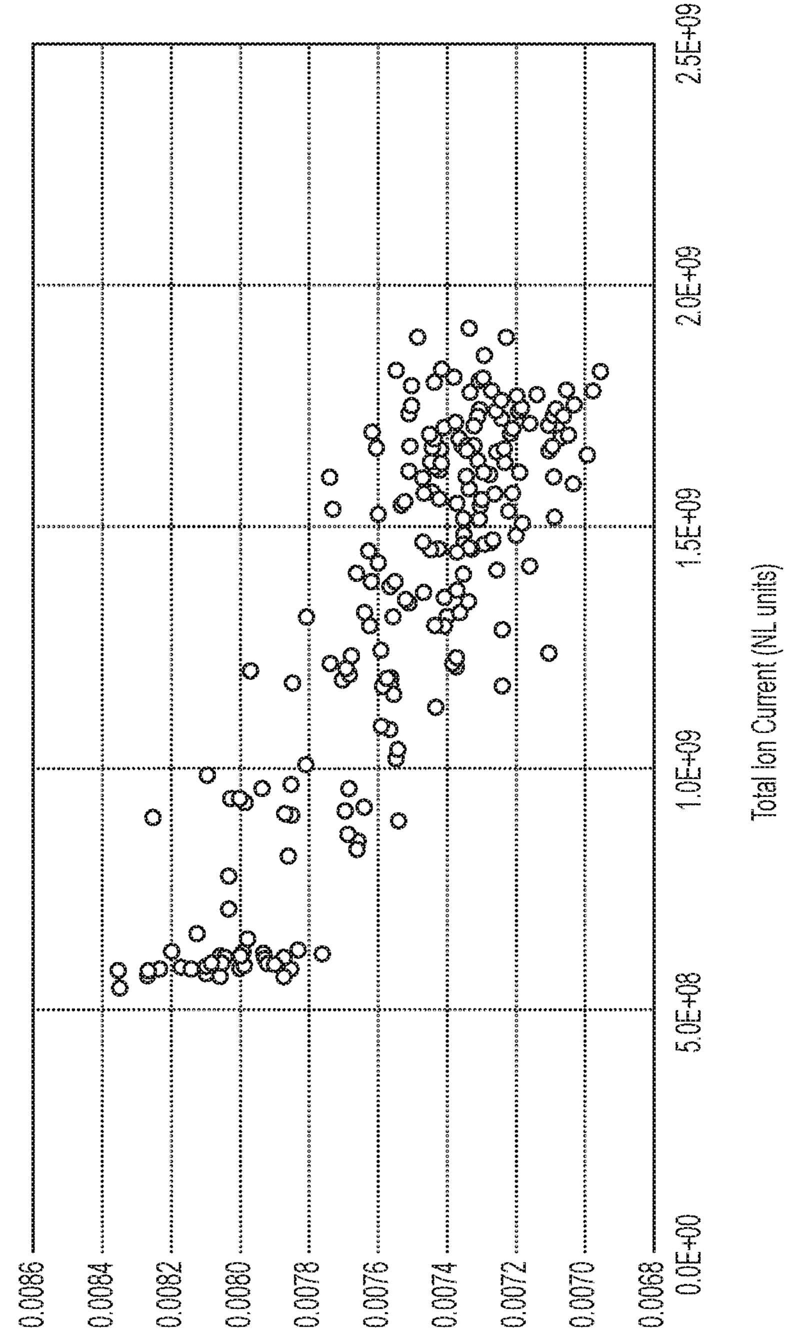
FIGS. 3A, 3B, 4A, 4B and 5 are graphs showing the variation of isotope ratio with ion flux.
Figure 3B:
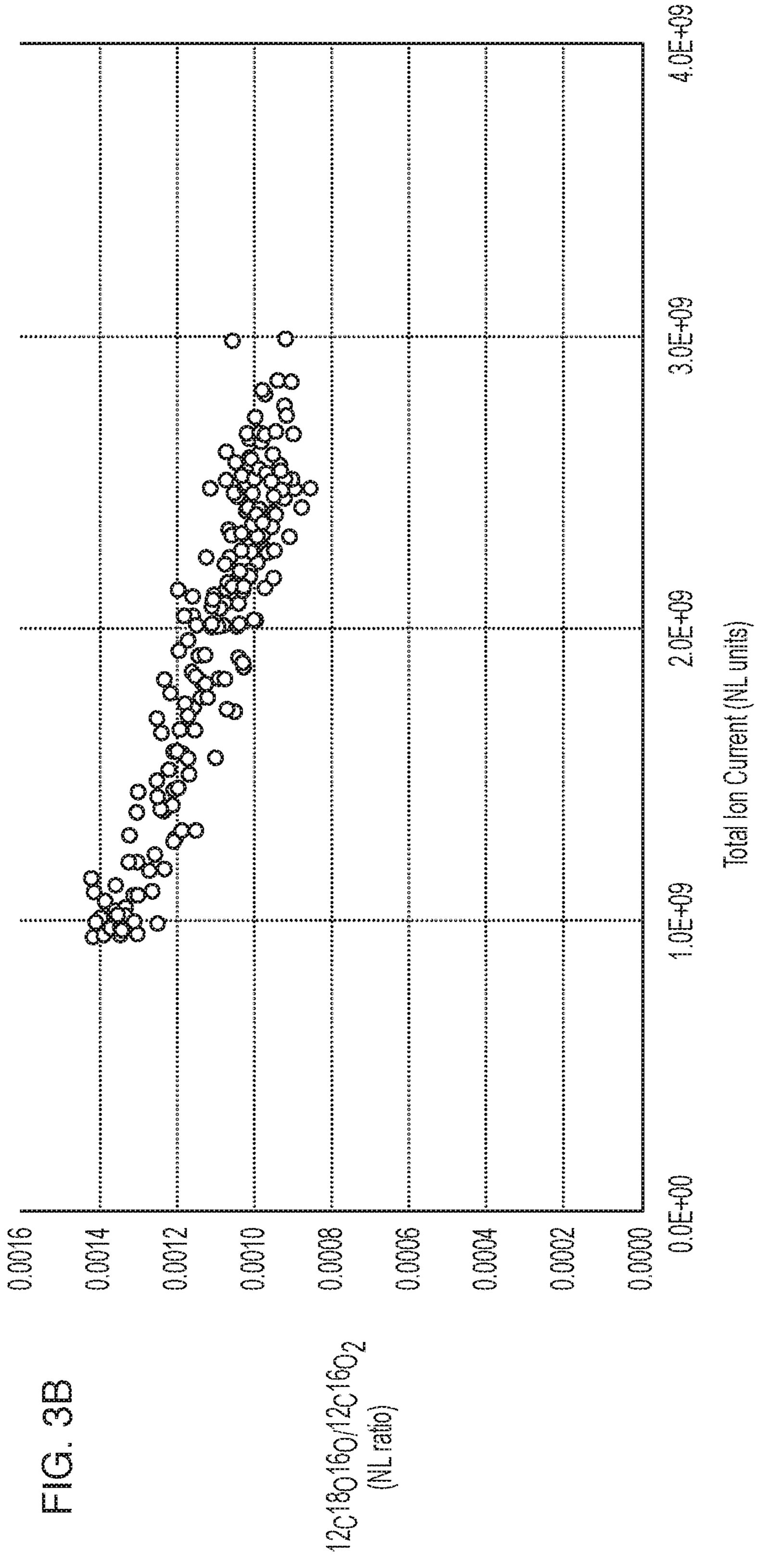

Thus, variations in ion flux leads to variations in the mass transmission function of the mass filter 50 which means the relative numbers of ions for the different isotopes can be affected differently. This leads to differences in the isotope ratio determined when the same sample is measured with different ion fluxes. FIGS. 3A and 3B show the variation of the $^{13}C$ and $^{18}O$ isotope ratio measured from the same $CO_2$ sample as the ion current shown in arbitrary units (NL) proportional to the number of ions measured passing through the mass filter 50 was varied (i.e. as the ion current was varied which effectively varies the ion flux). The observed dependency on ion current, and hence ion flux, is significantly larger than the precision of the mass spectrometer 10.

It can be beneficial, therefore, to control the ion current and hence ion flux. For example, using automatic gain control (AGC)-like functionality that adjusts the ion source tuning and front end ion optics tuning (upstream of the mass filter 50 and/or other RF transmission devices such as the RF transmission device 40) to keep the ion beam flux passing the RF transmission device 40 and mass filter 50 constant could be used to compensate for the effect. However, complete control of ion flux in practice is difficult to achieve. To take account of the effect fully, for example, precise so-called pressure-balancing would need to be performed, i.e. the sample and reference would need to get adjusted in intensity to match within a low to sub-percent range. An example of this technique is provided in Improvements in Mass Spectrometers for the Measurement of Small Differences in Isotope Abundance Ratios by C. R. McKinney, J. M. McCrea, S. Epstein, H. A. Allen, and H. C. Urey, Review of Scientific Instruments 21, 724 (1950), the entire contents of which are incorporated herein by reference. This is impractical for many measurements and impossible for signals that are not stable by their very nature, e.g. for low sample quantities that get quantitatively consumed during the measurement, or for transient signals, as in GC/MS (gas chromatography mass spectrometry) or LC/MS (liquid chromatography mass spectrometry).

In addition, it has been appreciated that, in theory in an ideal situation, the measured isotope ratio should not change if the transmissions of both isotopes are balanced equally either side of the centre point of the mass selection window, i.e. if the mass selection window is chosen to be centered around the isotopes of interest such that both isotopes sit at approximately the same position relative to the edges of the transmission function. This is because the rounding of the transmission function should alter equally at both edges so as to be symmetric and thus affect both isotopes equally. In that case, as the transmission function of the mass filter 50 varies with ion flux, the transmissions of both isotopes should be equally affected as the corners of the transmission function increase or decrease in curvature: as the change in the transmission of both isotopes is matched, the isotope ratio should not change.

A feature of the inventive concepts is, therefore, that the mass selection window of the mass filter 50 is preferably selected to be centred on the middle of the masses of the isotopes of interest. More preferably, the centre of the mass selection window is midway between the masses of the two isotopes of interest. Assuming symmetry in the transmission function, this means the variation in transmission with ion flux should be the same or very similar for both isotopes. This special selection of the mass selection window to be centred on the centre mass of the isotopes increases robustness against the ion flux/current dependence.

Figure 4A:
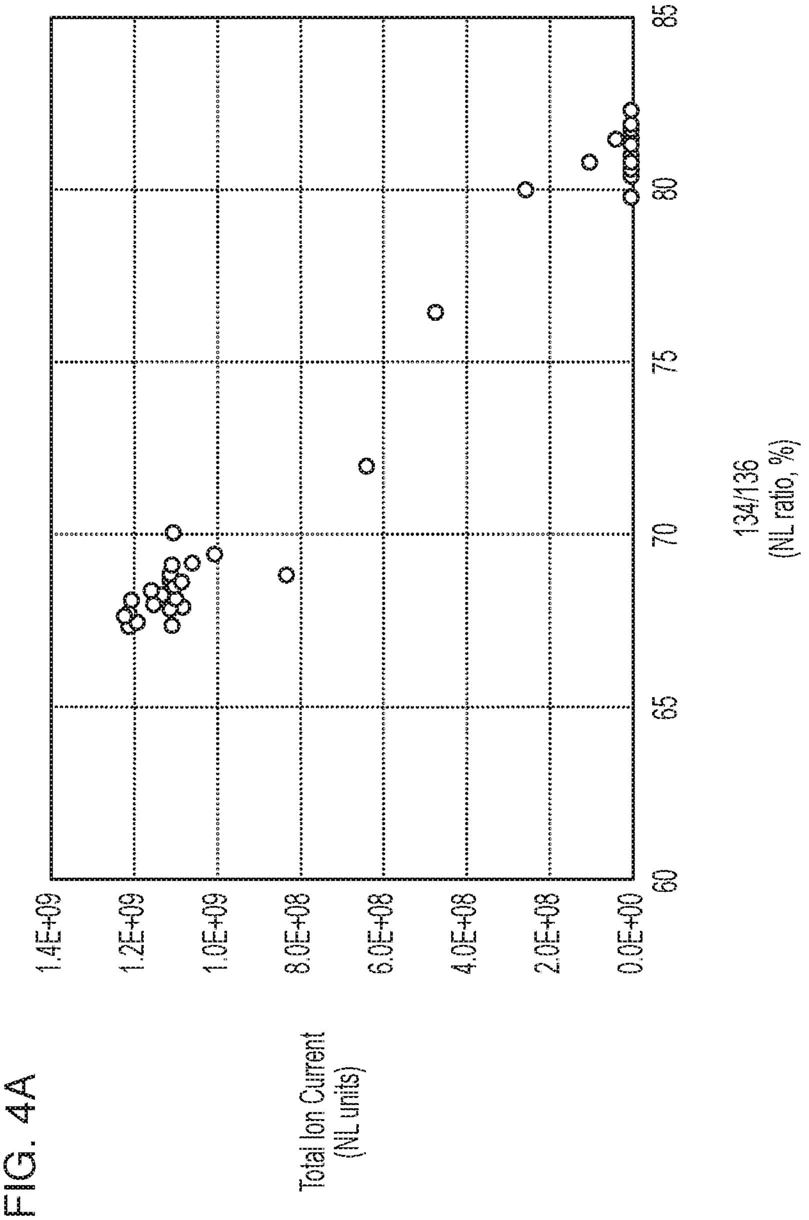
Figure 4B:
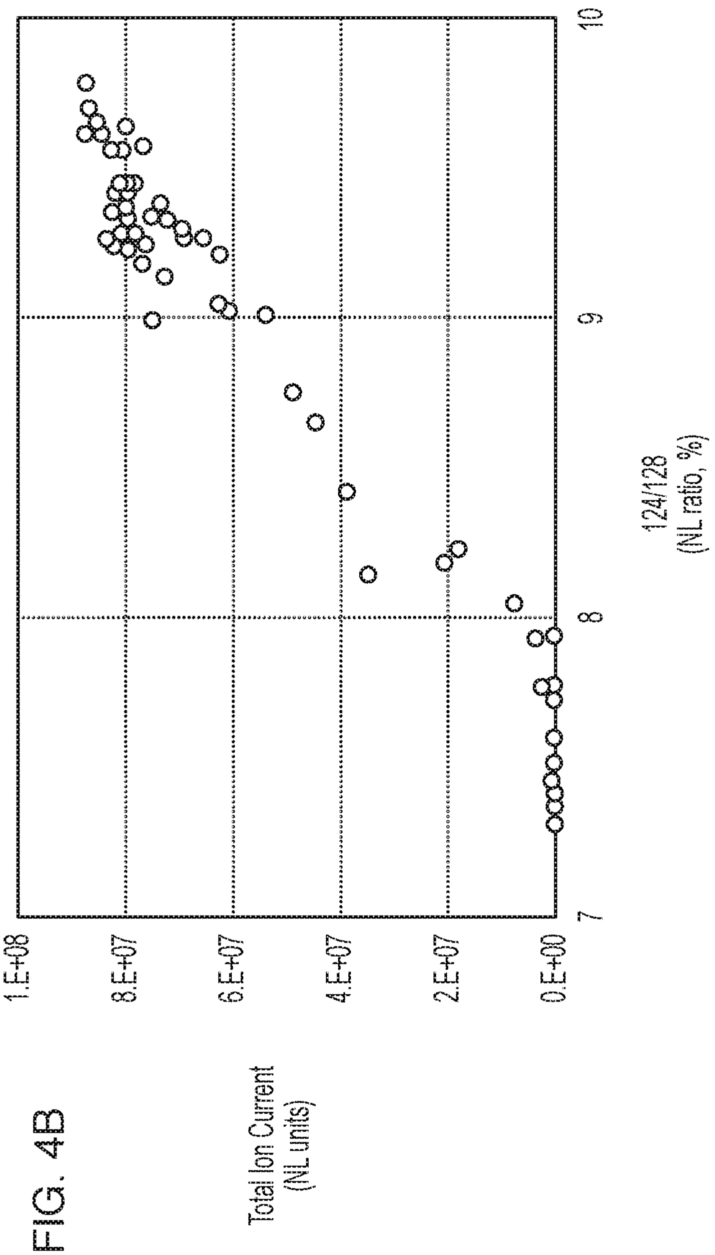
Figure 5:
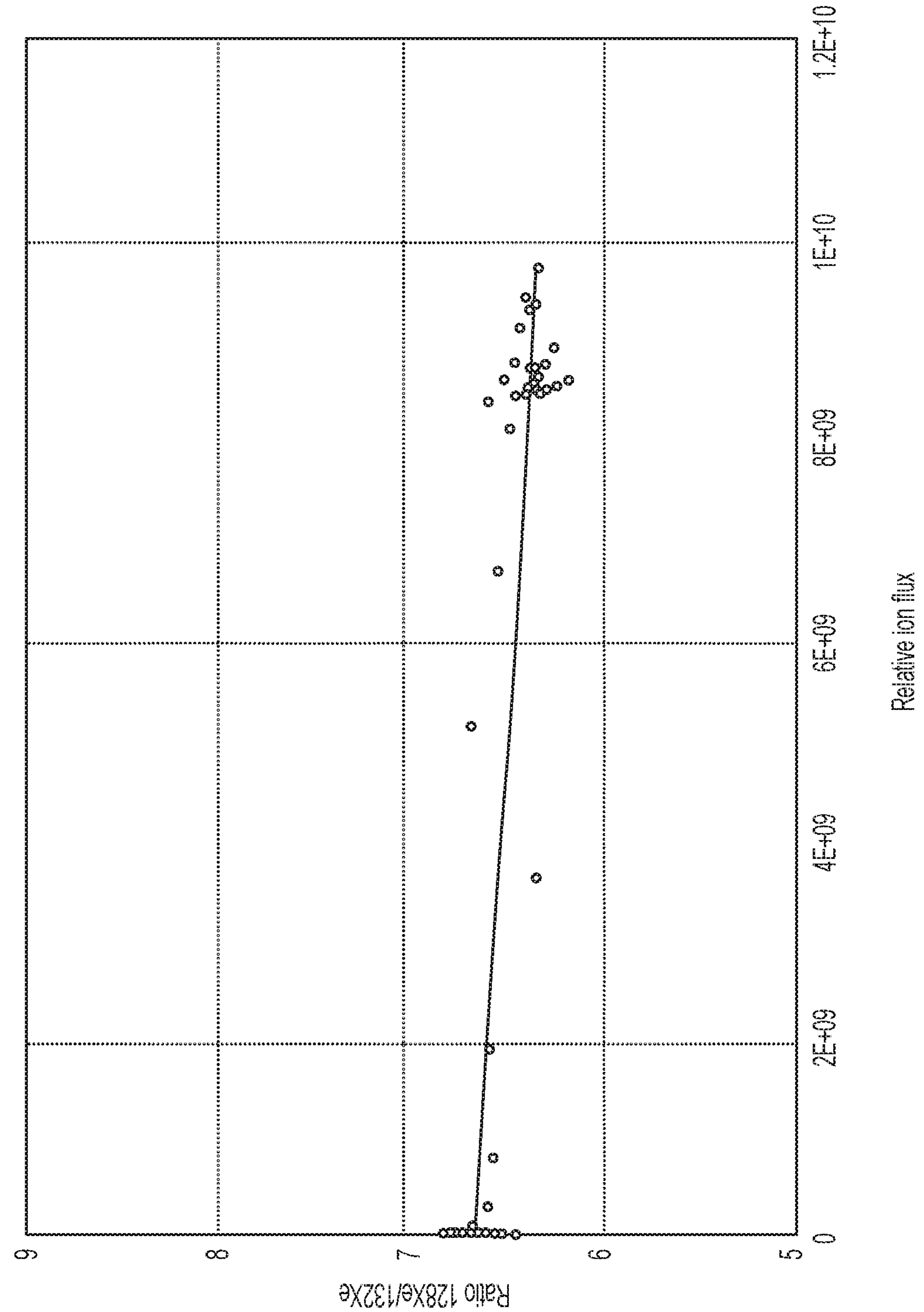

FIGS. 4A, 4B and 5 illustrate this effect. FIGS. 4A and 4B show the variation in isotope ratios measured on Xe gas in separate experiments. In these experiments, Xe sample gas was changed from high concentration to low concentration such that the ion current and ion flux decreased while measuring the isotope ratio. The experiment was performed in two ways: i) with the mass selection window of the mass filter 50 skewed towards the mass of the heavier isotope, and ii) with the mass selection window skewed towards the mass of the lighter isotope. FIG. 4B shows a $^{124}Xe/^{128}Xe$ isotope ratio as a function of ion current with an isolation range 120-128.1. FIG. 4A shows a $^{134}Xe/^{136}Xe$ isotope ratio as a function of ion current with an isolation range 133.8-140. The signal intensity (which corresponds to the relative ion flux) changed over several orders of magnitude during these experiments. It can be seen that the variation in measured isotope ratio depends on where the isotopes of interest lie within the mass selection window. The magnitude of the changes in measured isotope ratio is several tens of percent.

The experiment was repeated using a nearly symmetrical mass selection window, i.e. with the mass selection window centred on the average mass of the two Xe isotopes, and FIG. 5 shows the results ($^{128}Xe/^{132}Xe$ isotope ratio as a function of ion current for an isolation range 123-137). Compared to the results shown in FIG. 4, the relative change in the measured isotope ratio is very small. This shows that the variation in measured isotope ratio with ion flux/current may be reduced with careful selection of the mass selection window.

However, in practice, the transmissions of isotopes are not perfectly matched on either side of the centre point of the transmission window, i.e. the transmission function is not exactly symmetrical. Any transmission function is likely to display some second order structure that makes it more complex than just a slightly skewed 'bell'. Therefore, transmission of one isotope is affected more than the other isotope as the ion flux varies leading to change in the isotope ratio determined, even when the mass selection window is selected such with a centre mass occupying the middle of the two mass peaks of interest.

Another feature of the inventive concepts is, therefore, to calibrate the dependence of the measured isotope ratio on the ion current. This allows an ion current and isotope ratio to be measured and then adjusted to an isotope ratio for some other ion current based on the calibration. The other ion current may be an idealised ion current, may be the ion current used to measure another isotope ratio or may be an arbitrary ion current. The latter two examples are useful in sample/reference bracketing as it allows the isotope ratios for the sample and reference to be determined for the same ion current thereby removing any dependence upon ion current/flux caused by space charge effects.

Measuring the dependency of the isotope ratio on the ion current for a standard sample gives a curve trend similar to those of FIG. 3 or 4. The slope of such a curve for given isotopic species is characteristic to the experimental conditions, and is approximately independent of the value of the isotope ratio of the sample itself. Hence, a reference of known isotopic composition may be used to calibrate a mass spectrometer 10 at periodic intervals. Such calibrations may be made as part of an isotope ratio analysis, for instance by varying the rate of delivery of analyte to the ion source 20 as a controlled element of each analysis. Or, a calibration can be made prior to or after an analysis, provided other instrument tuning parameters (such as the mass range sampled by the quadrupole mass filter 50), the ion current target (when using the AGC-like current control described above), or the Orbitrap™ resolution are not changed between calibration and analysis. In practice, we find such calibrations are robust to uncontrolled changes in instrument state for time periods of days or more. Pairs of ion current and isotope ratio values may be measured and fitted to provide a calibration relationship that characterises how the isotope ratio value varies with ion current. This calibration relationship may then be applied to subsequent measurements of samples to be analysed. That is, an isotope ratio measured for any particular ion current may be adjusted to the isotope ratio for any other ion current. This allows direct comparison to measurements taken from a reference as the ion currents are effectively the same. Thus the variation caused by changes in ion flux is removed. As the isotope ratio of the reference is known, further correction may be applied to remove other sources of inaccuracy introduced by the mass spectrometer 10 thereby allowing the isotope ratio of the sample to be corrected.

Specifically, the ion current and isotope ratio may be measured from a reference or a sample to be analysed. A calibration relationship may then be determined and applied to convert the isotope ratio for the measured ion current to an isotope ratio for a different ion current. For example, the calibration relationship may be applied to convert a measured isotope ratio determined for a measured ion current to the equivalent isotope ratio that corresponds to an ion current used for another measurement of isotope ratio so as to allow direct comparison of the two measured isotope ratios. Alternatively, the calibration relationship can be used to correct the measured isotope ratio to the equivalent isotope ratio that would have been observed at the ion flux for which the calibration relationship is most precisely determined. This may correspond to the part of the data showing least scatter, e.g. the least scatter of data points about the line shown in FIG. 5. This correction may be applied on the data collected from both a sample and a reference to allow the isotope ratios measured to be determined for the same ion current and hence to allow a direct comparison, i.e. without ion flux dependent effects significantly affecting the isotope ratio.

Figure 6:
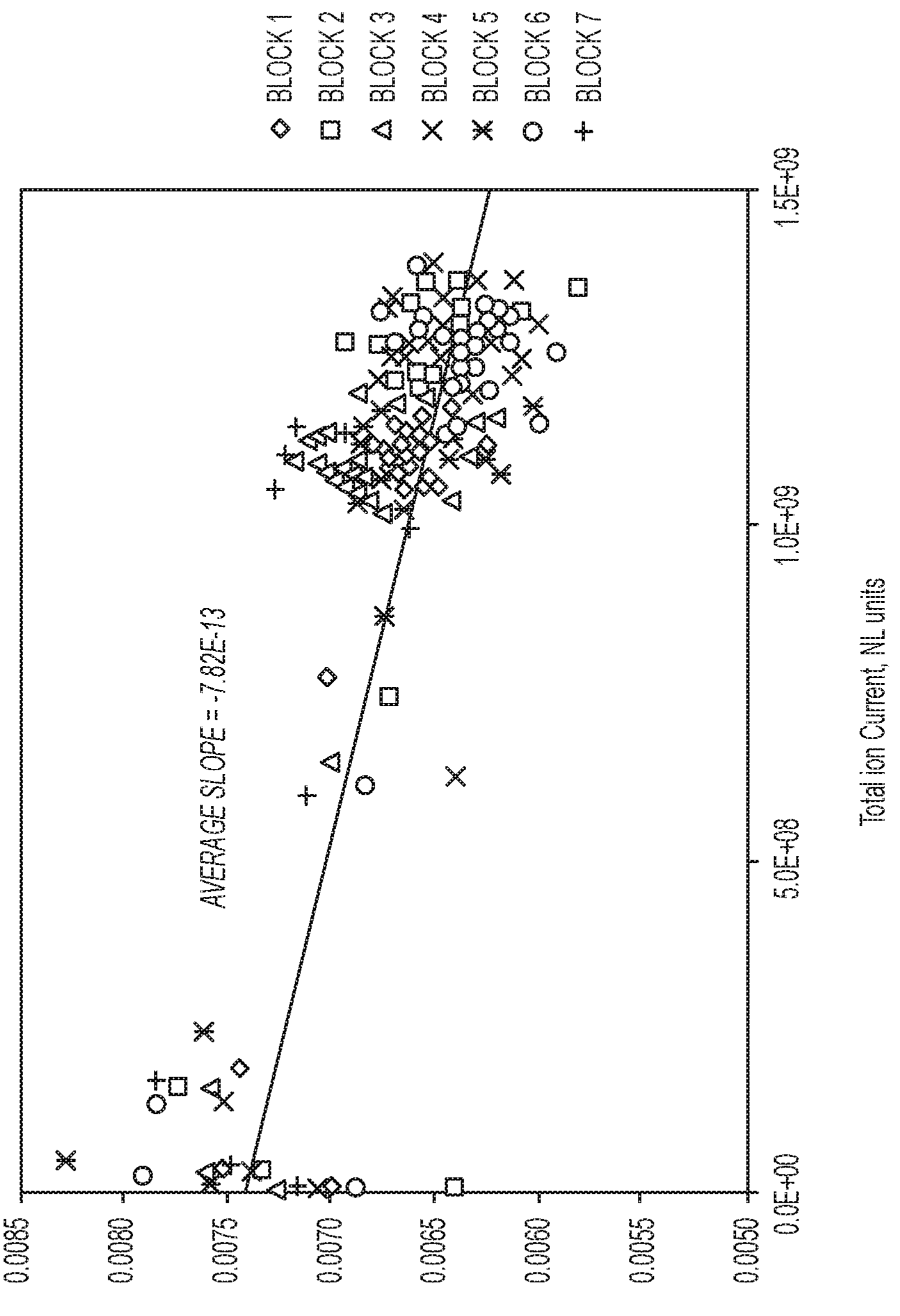
FIG. 6 is a graph showing measurements of isotope ratio with varying ion flux used to obtain a corrected isotope ratio.

An example of a calibration is shown in FIG. 6 for isotope ratio measurements on $CO_2$ gas. Two $CO_2$ gases that differ from each other in $^{13}C/^{12}C$ ratio were analysed under identical instrumental tuning and operating conditions. Measurements were made from three bracketed comparisons of two gases over seven contiguous blocks of measurement, such that gas 1 was observed for blocks 1, 3, 5, and 7, and gas 2 in blocks 2, 4 and 6. In this example, both gas 1 and 2 were interlaboratory reference $CO_2$ gases that were previously characterized for their $^{13}C/^{12}C$ and $^{18}O/^{17}O$ ratios using common techniques of gas source isotope ratio mass spectrometry. The mass range selected for analysis using the mass filter 50 was 43.5 to 45.5 amu so as to be centred around the isotopes of interest such that both isotopes sit at approximately the same position relative to the edges of the mass transmission function as described above.

The average $^{13}C/^{12}C$ ratio for each gas was measured, and the results are shown in FIG. 6. A trend can be seen that relates a decrease in measured isotope ratio as the total ion current increases. The relatively narrow mass range selected for analysis using the mass filter 50 was 43.5 to 45.5 amu led to significant fractionation of the $^{13}C^{16}O_2/^{12}C^{16}O_2$ ratio from its natural value of ~0.011 to measured values of ~0.007. More precisely, the average $^{13}C/^{12}C$ ratio measured for each gas was averaged across all blocks in which that gas was observed, and was observed to be 0.006694 for gas 1 and 0.00641 for gas 2. The average bracketed gas 1/gas 2 difference (13C/12C of gas 1 divided by 13C/12C of gas 2) was 0.957706. The partial pressures of $CO_2$ in the ion source 20 for these two samples differed by tens of percent, leading to the expectation that the fractionation was more extreme for gas 1 which was analysed at high ion source partial pressure (and thus high ion flux) than for gas 2 which was analysed at a lower ion source partial pressure.

In this example, the measured $^{13}C/^{12}C$ ratio for each block was adjusted by shifting the measured isotope ratios to the equivalent ratio value for zero total ion current. This form of correction effectively sees the isotope ratio corrected back to a theoretical ion current of zero where no space charge effects could arise. Fitting the data produced the line shown in FIG. 6 which was determined to have a gradient of $-7.823\times10^{-13}$. This was used in the correction by adding ($7.823\times10^{-13}\times NL$) to the measured $^{13}C/^{12}C$ ratio for that block. NL is the average intensity total ion current for that block measured in NL values (NL values are arbitrary units, and provide a value that is normalised to the largest peak in the mass spectrum and hence proportional to the number of ions). After this correction, the average observed $^{13}C/^{12}C$ ratio for each gas, averaged across all blocks in which that gas was observed, was 0.007554 for gas 1 and 0.007405 for gas 2, and the average bracketed gas 1/gas 2 difference was 0.98073. The true gas 1/gas 2 difference in 13C/12C ratio is 0.9782, within 2 standard errors of the corrected value and within the shot-noise-limited error of the true value.

With the calibration performed, subsequent measurements of isotope ratio and total ion current may be taken and the isotope ratio adjusted to an equivalent zero total ion current value using the gradient found in the calibration.

The calibration method need not be used in combination with the AGC-like current control and/or mass selection window centring techniques described above. Namely, to overcome the need for precise matching of signal intensities of sample and reference, it has been demonstrated that one can measure the dependency of the isotope ratio on ion current and then use the measured slope of the dependency to calibrate subsequent measurements. This improves the accuracy of the measurements significantly, even without the use of AGC-like current control and mass selection window centring.

The isotope ratio that is measured and corrected may be the isotope ratio (R) per se, or the isotope ratio expressed in another way such as the standard delta notation (δ-notation). The isotope ratio is generally the ratio of the heavy to light isotope (R), such as:

$$R = \frac{\text{Heavy Isotope}}{\text{Light Isotope}} = \frac{^{13}C}{^{12}C} = \frac{^{15}N}{^{14}N} = \frac{^{18}O}{^{16}O} \text{ etc.}$$

Alternatively, the isotope ratio could be the ratio of the light to heavy isotope. The measured isotope ratio can be calculated as delta notation (δ-notation), with the correction being performed using the values in δ-notation. The general way of reporting stable isotope ratios from Isotope Ratio Mass Spectrometry (IRMS) analysis is using delta notation. The δ-value is the stable isotope ratio of an unknown sample relative to a reference (material) of known isotope value, calculated as:

$$\delta[\%] = \frac{R_{(Sample)} - R_{(Standard)}}{R_{(Standard)}} * 1000 = \left(\frac{R_{(Sample)}}{R_{(Standard)}} - 1\right) * 1000 \quad \text{equation (1)}$$

Thus, herein the term isotope ratio means either the isotope ratio (R) or a value that represents the isotope ratio, such as the δ-value for example.

Figure 7:
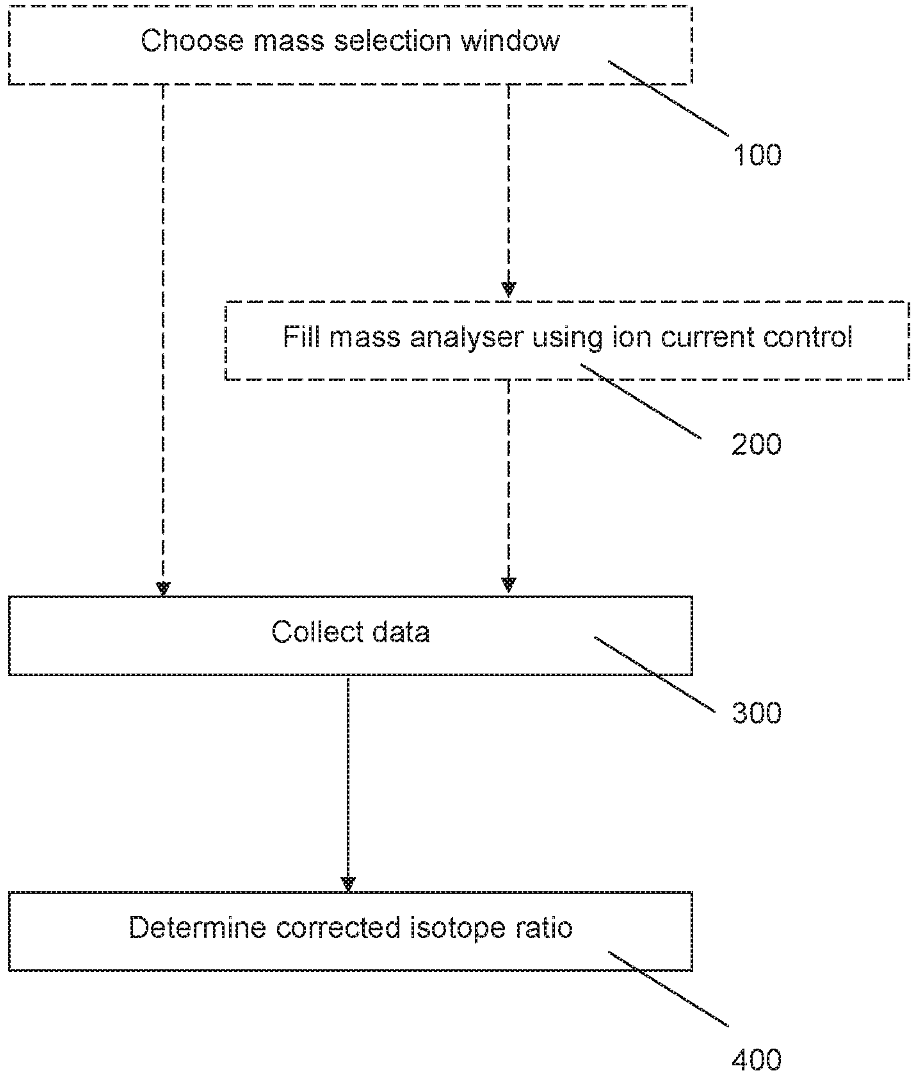
FIG. 7 illustrates a method of determining an isotope ratio in accordance with an embodiment of the inventive concepts.

FIG. 7 shows a method of obtaining an isotope ratio in accordance with an embodiment of the present inventive concepts, including two optional steps.

Optionally, the method may start with step 100 where a mass selection window is chosen. That is, the mass selection window of a mass filter 50 used to fill a mass analyser 80, for example like those of the mass spectrometer 10 of FIG. 1, is chosen so as to set the lower and upper limits to the m/z ratios of ions allowed to pass by the mass filter 50. For example, step 100 may comprise obtaining the m/z ratios of the isotopes of interest, and selecting a mass selection window that encompasses the m/z ratios of the isotopes of interest and is centred on the m/z ratios of the isotopes of interest, for example as described above. A choice may be made as to how much wider the mass selection window is chosen relative to the m/z ratios of the isotopes of interest. This choice is effectively a compromise: the wider the mass selection window, the more ions will fill the mass analyser 80 which will exacerbate space charge problems, but the narrower the window will see the m/z ratios of the isotopes of interest closer to the rounded edges of the mass transfer function where asymmetries may affect the number of isotopes unequally, as discussed above. This method may be implemented automatically, for example using a suitably programmed computer to control the quadrupole rod voltages of the mass filter 50 and hence the mass selection window, or may be implemented manually, for example by a skilled human operator.

The optional step 100 of choosing the mass selection window need not be performed in accordance with the method described above. The mass selection window may be fixed, or the width may be fixed and the centre chosen, or the centre may be fixed and the width may be chosen.

FIG. 7 then shows an optional step 200 of controlling the ion current during the fill of a linear trap of a mass spectrometer, like the linear trap 60 that supplies the mass analyser 80 of the mass spectrometer 10 of FIG. 1, using an automatic gain-like control, typically by operating an electrostatic gate prior to the trap 60. For example, and as discussed above, the total ion abundance within the linear trap 60 may be controlled, for example by adjusting ion source tuning and front end ion optics tuning to keep the ion beam flux passing the RF transmission device 40 and mass filter 50 constant. This technique may or may not be implemented in combination with step 100. When implemented in combination, step 100 is used to control the mass selection window used to fill the ion trap 60, during an initial fill used to obtain a rapid total ion abundance measurement for the automatic gain-like control and also for each subsequent high-resolution scan.

Step 300 sees a collection of data, namely the collection of mass spectra from ions passed to a mass analyser, for example a mass analyser 80 of a mass spectrometer 10 like that of FIG. 1. As noted above, filling the mass analyser 80 may be performed in combination with either or both of optional steps 100 and 200.

Collecting mass spectra 300 comprises determining the total number of ions of each isotope of interest for fills of the mass analyser 80 with differing numbers of ions (e.g. different total ion currents). This may be performed in combination with controlling the ion current when filling the linear trap 60 as described above with respect to step 200. For example, different total ion currents including and spread about an optimum ion current may be made, with the control of the ion current allowing the target total ion current for each fill to be achieved more precisely. Mass spectra may be collected from more than one source, for example from a sample and a reference such as by using the sample/reference bracketing method described above. Mass spectra may be determined for differing numbers of ions for all or some of the different sources, as will be explained in more detail below.

Collecting mass spectra may comprise determining the abundances of ions with different m/z values. As the m/z values of the isotopes of interest are known, the abundance of each isotope of interest may be determined.

Step 400 sees a determination of at least one corrected isotope ratio. As noted above, step 300 sees the abundance of each isotope of interest determined such that the isotope ratio for each fill may be determined. However, as discussed above, each isotope ratio may be affected by space charge effects, and the ratios will be affected differently for different total ion currents. Step 400 sees the isotope ratios that were determined for a source (sample or reference) using different ion currents used in a calibration to allow an adjusted isotope ratio to be determined. How this is done is described next with reference to FIGS. 8, 9 and 10.

Figure 8:
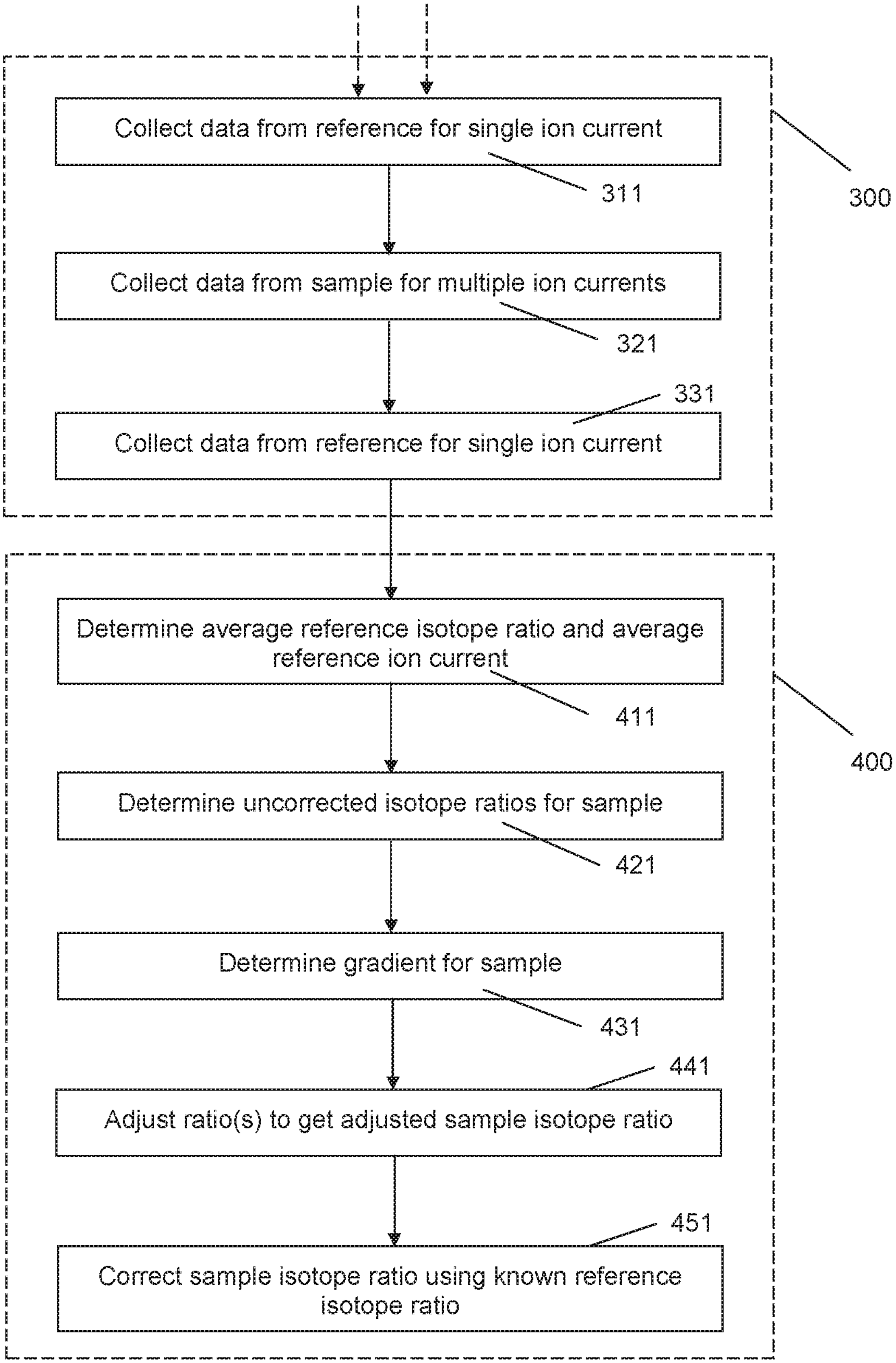
FIGS. 8 to 10 show three embodiments of the steps of collecting data and determining a corrected isotope ratio shown in FIG. 7.

FIG. 8 shows a first embodiment of determining a corrected isotope ratio of a sample. As indicated by the dashed arrows at the top of FIG. 8, the method may be preceded by step 100 and/or step 200. In any event, data are collected at step 300. First, at step 311, data are collected from a reference using a single ion current that is measured.

In a contemplated embodiment, the charge detection device 95 of FIG. 1 may be used to measure the ion current. This may be done in parallel to the mass analyser 80 acquiring data from which the mass spectra are derived. For example, while an analytical scan in the mass analyser 80 is being acquired, one or more fills of the linear trap 60 are ejected to the charge detection device 95 to measure the charge that was stored in the linear trap 60. This measured charge allows the ion current into the linear trap 60, and thus through the mass filter 50, to be calculated.

In another contemplated embodiment, the mass analyser 80 is used to measure the ion current. For example, the total charge delivered to the mass analyser 80 may be obtained from the total number of ions detected by the mass analyser 80. This total charge allows the ion current into the mass analyser 80, and thus through the mass filter 50, to be calculated.

Next, at step 321, data are collected from the sample to be analysed across a range of ion currents, each of which is measured. These currents may be measured as described in the preceding pair of paragraphs. Optionally, experimental conditions may be used that result in ion currents that vary around the ion current used for collecting data from the reference in step 311.

Then, at step 331, data are collected from the reference using a single ion current that is measured. Essentially, step

331 is a repeat of step 311. Together, steps 311, 321 and 331 form an example of sample/reference bracketing where an analysis of a sample is bracketed by measurements taken from a reference with a known isotope ratio.

With the data collection 300 completed, the method may progress to determining a corrected isotope ratio 400, as will now be explained.

The first part of step 400 sees an average reference isotope ratio and average reference ion current determined at step 411. That is, the data collected at step 311 are used to determine the isotope ratio of the reference. For example, and as described above, the abundance of each isotope of interest may be determined (and hence the isotope ratio by dividing one isotope's abundance by the other). This is repeated for the data collected at step 331. Then, the pair of isotope ratios are averaged to obtain an average reference isotope ratio, and the average value of the pair of ion currents determined at steps 311 and 331 is determined to provide an average reference ion current.

Next, at step 421, the uncorrected isotope ratios for the data collected from the sample are determined. As described above, the abundance of each isotope of interest may be determined (and hence the isotope ratio by dividing one isotope's abundance by the other). This is performed across all or some of the fills that correspond to the different total ion currents. Hence, a set of measured isotope ratios are determined for different total ion currents.

The relationship governing the variation in measured isotope ratio with total ion current for the sample can then be determined at step 431 in any standard way, for example through fitting. One way of determining the relationship may be appreciated from a consideration of the graph of FIG. 6 that shows the variation of measured isotope ratio with total ion current. Where a linear relationship is assumed, a straight line may be fitted through the datum points that each corresponds to a measured isotope ratio, and the gradient of the line found. More complex fitting may be performed where the data points suggest a non-linear relationship.

With the gradient determined at step 431, the method may proceed to step 441 where the already collected data from step 321 may be used to obtain an adjusted sample isotope ratio. The adjusted sample isotope ratio corresponds to the sample isotope ratio that would have been obtained if an ion current equal to the average reference ion current had been used. For example, one of the measured sample isotope ratios may be selected for adjustment. To adjust the ratio, its value is multiplied by the product of the gradient found at step 431 and the difference in total ion current (i.e. the difference between the ion current used for that measured isotope ratio and the average reference ion current). This effectively sees the measured ratio value adjusted to the ratio value appearing at the average reference ion current. This may be envisaged by taking a datum point from FIG. 6, and moving it along the fitted line to the x-axis value representing the average reference ion current.

Other methods of implementing step 441 are possible. For example, more than one measured isotope ratio may be used, including all available measured isotope ratios. Each measured ratio may be adjusted to the average reference ion current as described above, and then an average of these ratios taken to obtain a single adjusted isotope ratio value. Alternatively, an average may be obtained first by averaging the datum points to obtain an average measured sample isotope ratio and corresponding average sample total ion current. Then the average sample isotope ratio value may be multiplied by the product of the gradient and the difference in total ion current (i.e. the difference between the average sample ion current and the average reference ion current).

With step 441 completed, isotope ratios for the sample and the reference have been determined for a common ion current which removes the variation due to space charge effects. A further correction may now be performed at step 451 to remove errors arising from other effects within the mass spectrometer 10. This correction is performed using the known isotope ratio for the reference, i.e. variations between the average reference isotope ratio and the known reference isotope ratio may be corrected, and the same correction applied to the adjusted sample isotope ratio.

Figure 9:
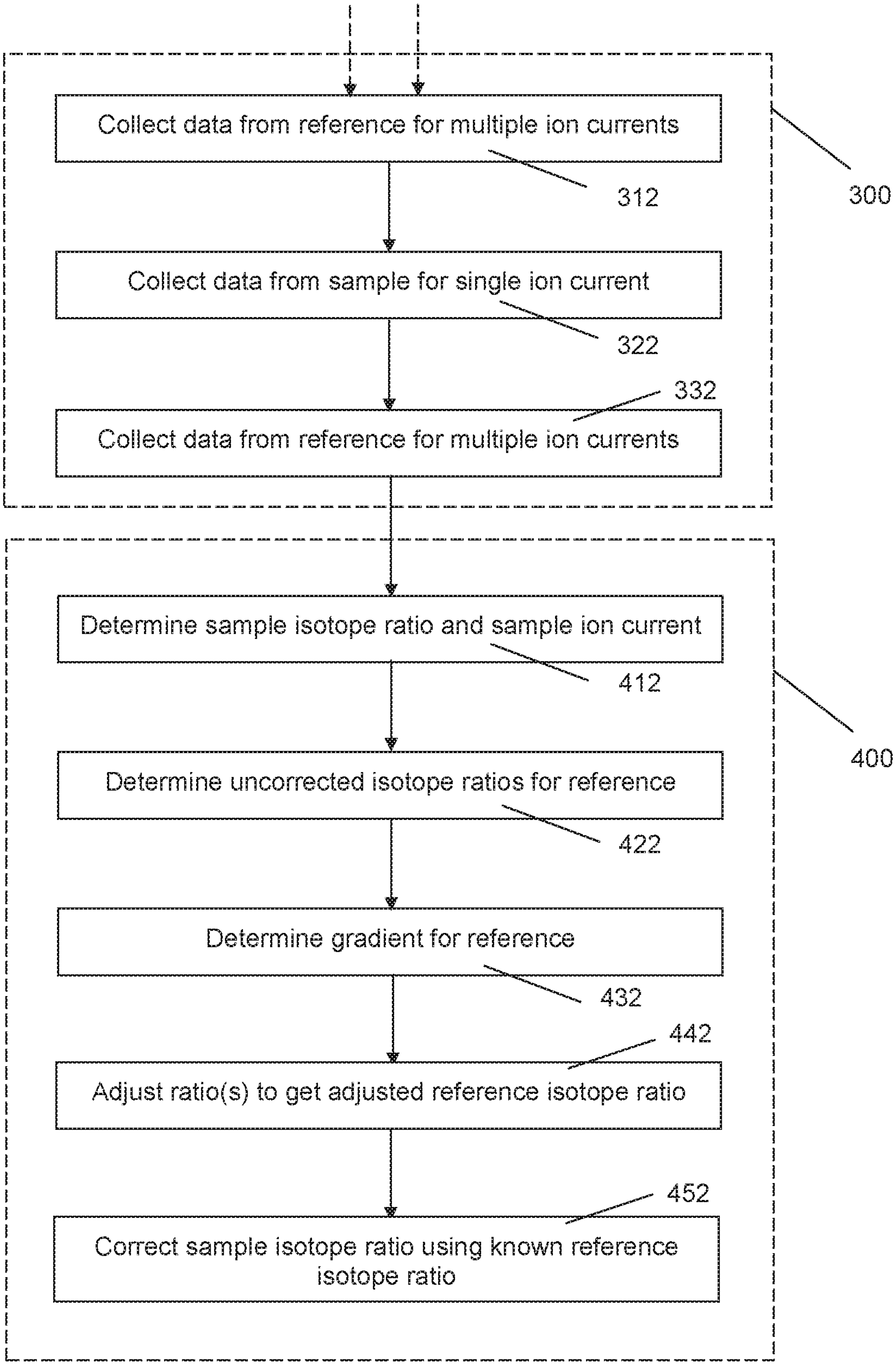

An alternative embodiment of determining a corrected isotope ratio of a sample is shown in FIG. 9. In this embodiment, the reference and sample are effectively reversed, i.e. data are collected from the sample using a single ion current while the calibration method is used to adjust the isotope ratio for the reference to the ratio that would have been obtained using the same ion current as was used for the sample.

As before, the method may be preceded by step 100 and/or step 200. In any event, data is collected at step 300. First, at step 312, data are collected from a reference across a range of ion currents each of which is measured. These currents may be measured as described above with respect to the embodiment of FIG. 8. Next, at step 322, data are collected from the sample to be analysed using a single ion current which is measured. This current may be measured as described above with respect to the embodiment of FIG. 8. Then, at step 332, data are collected from the reference across a range of ion currents each of which is measured. Essentially, step 332 is a repeat of step 312.

With the data collection 300 completed, the method may progress to determining a corrected isotope ratio 400, as will now be explained.

The first part of step 400 sees the sample isotope ratio and sample ion current determined at step 412. That is, the data collected at step 322 are used to determine the isotope ratio of the sample. Next, at step 422, the uncorrected isotope ratios for the reference are determined. This is performed across all or some of the fills that correspond to the different total ion currents used in steps 312 and 332. Hence, a set of measured isotope ratios are determined for different total ion currents. The relationship governing the variation in measured isotope ratio with total ion current can then be determined at step 432 in any standard way, for example through fitting as was explained with reference to step 431 of FIG. 8.

With the gradient determined at step 432, the method may proceed to step 442 where the already collected data from steps 312 and 332 may be used to obtain an adjusted reference isotope ratio. The adjusted reference isotope ratio corresponds to the reference isotope ratio that would have been obtained if an ion current equal to the sample ion current had been used. For example, one of the measured reference isotope ratios may be selected for adjustment. To adjust the ratio, its value is multiplied by the product of the gradient found at step 432 and the difference in total ion current (i.e. the difference between the ion current used for that measured isotope ratio and the sample ion current). This effectively sees the measured ratio value adjusted to the ratio value appearing at the sample ion current. Other methods of implementing step 442 are possible as has been explained above for step 441.

With step 442 completed, isotope ratios for the sample and the reference have been determined which removes the variation due to space charge effects. A further correction may now be performed at step 452 to remove errors arising from other effects within the mass spectrometer 10, as was done in step 451 of FIG. 8.

Figure 10:
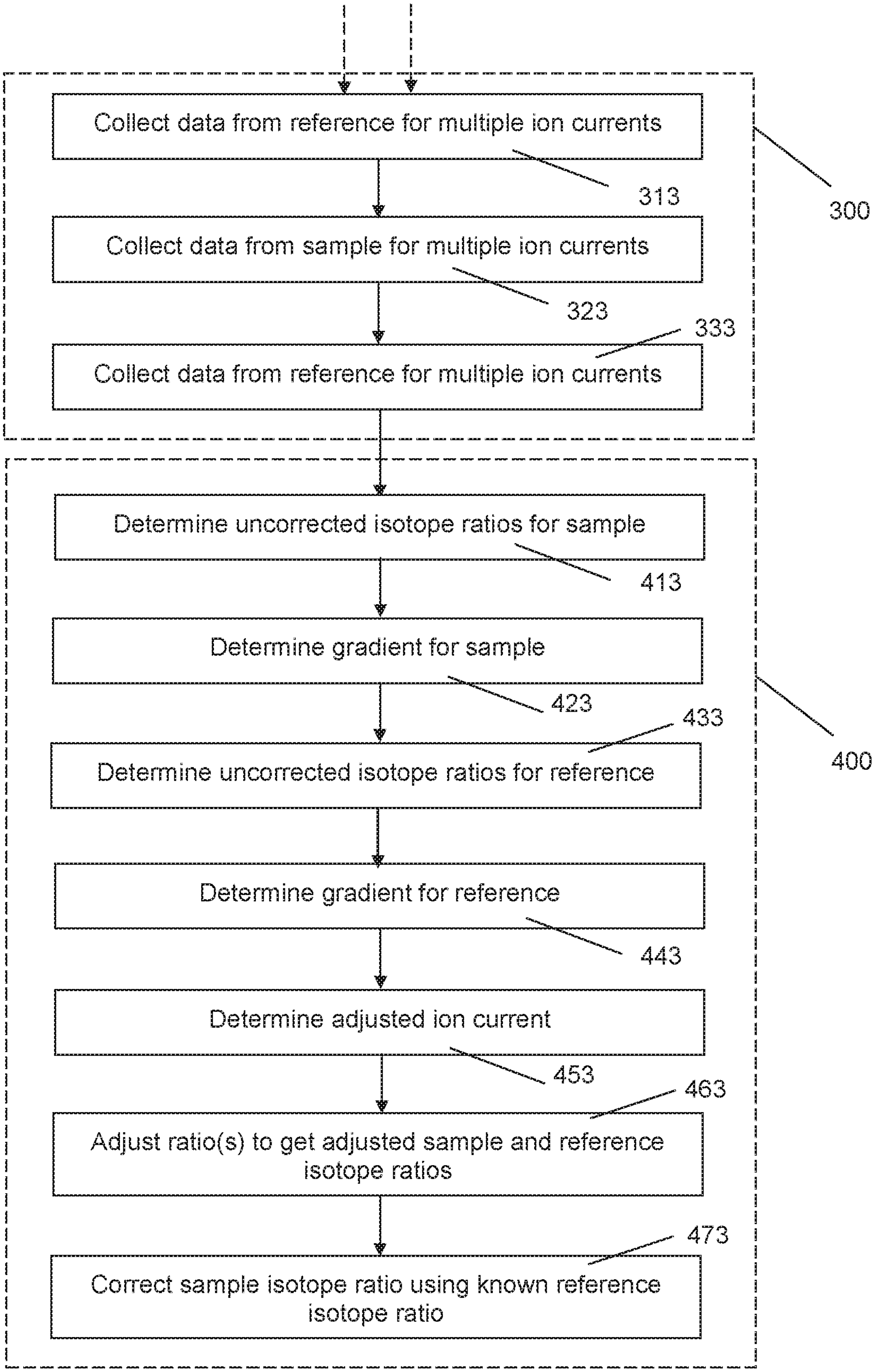

Another alternative embodiment of determining a corrected isotope ratio of a sample is shown in FIG. 10. In this embodiment, the isotope ratios of both the reference and sample are adjusted to a common ion current.

As before, the method may be preceded by step 100 and/or step 200. In any event, data is collected at step 300. First, at step 313, data are collected from a reference across a range of ion currents each of which is measured. These currents may be measured as described above with respect to the embodiment of FIG. 8. Next, at step 323, data are collected from the sample to be analysed across a range of ion currents each of which is measured. These currents may be measured as described above with respect to the embodiment of FIG. 8. Then, at step 333, data are collected from the reference across a range of ion currents each of which is measured. Essentially, step 333 is a repeat of step 313.

With the data collection 300 completed, the method may progress to determining a corrected isotope ratio 400, as will now be explained.

The first part of step 400 sees uncorrected isotope ratios for the sample determined at step 413. This is performed across all or some of the fills that correspond to the different total ion currents used in steps 313 and 333. Hence, a set of measured sample isotope ratios are determined for different sample ion currents. The relationship governing the variation in measured sample isotope ratio with sample ion current can then be determined at step 423 in any standard way, for example through fitting as was explained with reference to step 431 of FIG. 8.

Next, at step 433, the uncorrected isotope ratios for the reference are determined. This is performed across all or some of the fills that correspond to the different total ion currents used in steps 313 and 333. Hence, a set of measured reference isotope ratios are determined for different reference ion currents. The relationship governing the variation in measured reference isotope ratio with reference ion current can then be determined at step 443 in any standard way, for example through fitting as was explained with reference to step 431 of FIG. 8.

At step 453, an adjusted ion current is determined (i.e. the ion current to which the sample and reference isotope ratios will be adjusted). The adjusted ion current may be determined in many different ways. For example, an arbitrary value may be chosen. This value may be chosen to lie within the range of ion currents during the data collection of steps 313, 323 and 333. Alternatively, an adjusted ion current outside of this range may be selected. An adjusted ion current of zero may be selected.

The adjusted ion current need not be arbitrarily determined, but may be calculated. Two different embodiments are particularly contemplated.

In a first example, an adjusted ion current corresponding to the least variation in the measured data is determined. This adjusted ion current will be referred to as the "least variation" ion current below.

In a second example, the adjusted ion current is calculated to be the ion current at which the known isotope ratio of the reference would be obtained. That is, the reference gradient found in step 443 is used to determine the ion current value that corresponds to the known isotope ratio of the reference. This adjusted ion current will be referred to as the "known ratio" ion current below.

With the gradients determined at steps 423 and 443, and the adjusted ion current determined at step 453, the method may proceed to step 463 where the already collected data from steps 313, 323 and 333 may be used to obtain both an adjusted reference isotope ratio and an adjusted sample isotope ratio. The adjusted reference and sample isotope ratios correspond to the reference and sample isotope ratios that would have been obtained if an ion current equal to the adjusted ion current had been used. The adjustment is performed as has been explained above. For example, one of the measured reference isotope ratios may be selected for adjustment. To adjust the ratio, its value is multiplied by the product of the gradient found at step 443 and the difference in ion current (i.e. the difference between the ion current used for that measured isotope ratio and the adjusted ion current). Other methods of implementing step 442 are possible as has been explained above for step 441 of FIG. 8. The same or different methods may be used to adjust the sample and reference isotope ratios. If the adjusted ion current was chosen to be the known ratio ion current, then only the adjusted sample isotope ratio need be determined in step 463 (as the adjusted reference isotope ratio is the known isotope ratio for the reference).

With step 463 completed, isotope ratios for the sample and the reference have been determined for a common ion current which removes the variation due to space charge effects. Moreover, correcting both the sample and reference isotope ratios provides better results as more data are used which allows better removal of noise in the data which would otherwise not be removed if using a single ion current for just the sample or reference.

A further correction may now be performed at step 473 to remove errors arising from other effects within the mass spectrometer 10, as was done in step 451 of FIG. 8. However, if the adjusted ion current was chosen to be the known ratio ion current, this final step 473 may be omitted as the adjusted sample isotope ratio will be the equivalent of the known isotope ratio of the reference.

Those skilled in the art will appreciate that variations may be made to the above embodiments without departing from the scope of the inventive concepts that are defined by the appended claims.

The embodiments of FIGS. 8, 9 and 10 have been described in the context of sample/reference bracketing. This sees data collection from the sample to be analysed (steps 321, 322, 323) bracketed between earlier and later steps of data collection from the reference (steps 311, 312, 313 and 331, 332, 333). However, the present inventive concepts also encompass embodiments where data are collected from the reference only before or only after data are collected from the sample. Then, the isotope ratios for the sample and reference may still be compared for a common ion current by adjusting the isotope ratio for the sample or reference or both. In the embodiment of FIG. 8, the reference isotope ratio and reference ion current may be found at step 411 (there is no longer a need to take an average). In the embodiments of FIGS. 9 and 10, the adjusted isotope ratio is found in the same way but using just data collected in a single data collection step.

It will also be appreciated that the order of some of the steps of FIGS. 8, 9 and 10 may be varied. Clearly, data must be collected before those data can be processed, but there is no need to collect all data before processing can begin. For example, in the embodiment of FIG. 8, step 411 that used the data collected from the reference may not start until the data collection of step 331 has completed. However, the steps 421 and 431 that use the data collected from the sample may start as soon as step 321 has completed, i.e. steps 421 and 431 may be performed before or concurrently with step 331.

Similarly step 412 of the embodiment of FIG. 9 may be performed once the data collection from the sample has completed at step 322, and so may be performed before or concurrently with data collection from the reference at step 332. Also, the order of the steps within the correction part 400 of FIG. 10 may be varied: in FIG. 10, the data for the sample are processed before the data from the reference, but this order may be reversed. As a final example, depending on how the adjusted ion current is selected, there may be great flexibility as to when step 453 is performed in the embodiment of FIG. 10. For instance, if an entirely arbitrary adjusted ion current is chosen, this may be chosen at any time before step 463 is started. In fact, the adjusted ion current may be chosen hours or even days before data collection at 300 starts.

Although the mass spectrometer of FIG. 1 has a quadrupole mass filter 50, the present inventive concepts may be used with mass spectrometers using other types of devices guiding generated ions having a mass transfer function that varies with ion current, in particular with mass spectrometers using other types of ion or mass selection devices. Such a device guiding generated ions having a mass transfer function that varies with ion current can be a gas-dynamic transport device, a transport device with at least one RF field, a transport device with at least one static electric and/or magnetic field and can consist of subunits which realise to function of the device together. Then the subunits have a common mass transfer function that varies with ion current and are guiding the generated ions on their trajectories from their ion source to the mass analyser.

For example, the present inventive concepts may be used in other instruments more generally comprising an ion optical device having a space charge dependent mass transmission function (i.e. a transmission function having a mass bias that is space charge dependent). The mass analyser for the isotope ratio measurement does not need to be an Orbitrap™ mass spectrometer, comprising an orbital trapping mass analyser. For example the present inventive concepts may be used in mass spectrometers comprising a magnetic sector mass analyser, for example of a type as commonly used for isotope ratio mass spectrometry.

For example, ion selection or mass selection devices may be chosen from quadrupole mass filters, Wien filters, electrostatic filters, other multipole types of mass filters, time-of-flight mass filters, ion trap (linear or quadrupole) mass filters, any other types of filter that implement ion selection based on other physical properties such as ion mobility drift time or field-asymmetric ion mobility, and any other devices that are capable of discriminating ions based on chemical or physical properties.

The mass analyser for the isotope ratio measurement does not need to be an Orbitrap™ mass spectrometer comprising an orbital trapping mass analyser, for example the present inventive concepts may be used in other magnetic sector mass analysers like those as commonly used for isotope ratio mass spectrometry.

Mass analysers may be chosen from electrostatic trap mass analysers, especially orbital trapping electrostatic trap mass analysers (for example Orbitrap™ devices), magnetic sector mass analysers, time-of-flight mass analysers, ion trap mass analysers, Fourier transform (FT) mass analysers, e.g. ion cyclotron resonance (ICR) mass analysers), quadrupole mass analysers, or other orbital trapping mass analysers (e.g. Cassini traps).

In addition to applying the calibration correction according to the present inventive concepts to mass spectrometry data as it is being collected, the correction can also be applied to historic data. Also, the calibration correction according to the present inventive concepts may be obtained for one compound and then used with respect to other compounds and classes of compounds.

It will be appreciated that steps of the method may be performed in an order other than stated in the examples above, unless indicated or required otherwise.

The invention claimed is:

1. A method of determining, based on mass spectrometry, an isotope ratio of ions from a source of ions, the method comprising:

obtaining a plurality of mass spectra of ions, wherein obtaining each mass spectrum of the plurality of mass spectra comprises:

generating ions from a first source of ions;

guiding the generated ions through a device having a mass transfer function that varies with ion current;

providing at least some of the ions to a mass analyzer;

obtaining, from the mass analyzer, a mass spectrum of the ions provided to the mass analyzer; and determining the ion current of the ions provided to the mass analyzer;

wherein the mass spectra are obtained for different measured ion currents;

determining an isotope ratio of ions provided to the mass analyzer from each mass spectrum;

determining, based on using the determined isotope ratio and determined ion current for each mass spectrum, a calibration relationship that characterizes a variation of the determined isotope ratios and the measured ion currents across the mass spectra; and adjusting, based on the calibration relationship, a measured isotope ratio obtained at a determined ion current to an adjusted isotope ratio corresponding to a selected ion current.

2. The method of claim 1, further comprising:

generating ions from a second source of ions;

guiding the ions generated from the second source of ions through the device having the mass transfer function that varies with ion current;

providing at least some of the ions generated from the second source of ions to the mass analyzer;

obtaining, from the mass analyzer, a mass spectrum of the ions provided to the mass analyzer that were generated from the second source of ions;

determining the ion current of the ions provided to the mass analyzer that were generated from the second source of ions; and determining an isotope ratio of ions provided to the mass analyzer that were generated from the second source of ions from the mass spectrum.

3. The method of claim 2, further comprising selecting the determined ion current of the ions from the second source of ions as the selected ion current, and wherein adjusting the measured isotope ratio comprises adjusting the measured isotope ratio or ratios obtained for the ions from the first source of ions using based on the calibration relationship to adjust the measured isotope ratio or ratios to an adjusted isotope ratio corresponding to the selected ion current.

4. The method of claim 2, wherein the first source of ions is a reference with a known isotope ratio and the second source of ions is a sample with an unknown isotope ratio.

5. The method of claim 4, further comprising determining, based on the calibration relationship, the ion current corresponding to the known isotope ratio of the reference, and selecting the ion current as the selected ion current, wherein adjusting the measured isotope ratio obtained at the determined ion current by using the calibration relationship to adjust the measured isotope ratio to the adjusted isotope ratio corresponding to the selected ion current comprises adjusting the measured isotope ratio of the sample to the selected ion current that corresponds to the known isotope ratio of the reference thereby providing a corrected isotope ratio for the sample.

6. The method of claim 1, further comprising:

obtaining a plurality of mass spectra of ions from a second source of ions, wherein obtaining each mass spectrum of the plurality of mass spectra comprises:

generating ions from the second source of ions;

guiding the ions generated from the ions from the second source of ions through the device having the mass transfer function that varies with ion current;

providing at least some of the ions generated from the ions from the second source of ions to the mass analyzer;

obtaining, from the mass analyzer, a mass spectrum of the ions provided to the mass analyzer from the ions from the second source of ions;

determining the ion current of the ions provided to the mass analyzer from the ions from the second source of ions; and determining the isotope ratio of ions provided to the mass analyzer from the ions from the second source of ions from the mass spectrum;

determining, based on the determined isotope ratio and determined ion current for each mass spectrum obtained from the ions from the second source of ions, a sample calibration relationship that characterizes a variation of the determined isotope ratios and the measured ion currents across the mass spectra obtained from the ions from the second source of ions; and adjusting, based on the calibration relationship determined for the ions from the second source of ions, a measured isotope ratio or ratios of the ions from the second source of ions to an adjusted isotope ratio for the ions from the second source of ions corresponding to the selected ion current used when adjusting the measured isotope ratio or ratios of the ions from the first source of ions.

7. The method of claim 1, wherein determining the ion current of the ions provided to the mass analyzer comprises:

determining the total number of ions provided to the mass analyzer from the mass spectrum;

determining the time during which the ions were provided to the mass analyzer; and calculating the ion current from the determined total number of ions and the determined time.

8. The method of claim 1, wherein determining the ion current of the ions provided to the mass analyzer comprises determining the ion current using based on an output of a charge collection device separate from the mass analyzer.

9. The method of claim 8, further comprising providing ions to the charge collection device by generating ions and then providing the ions to the charge collection device, while the mass analyzer is collecting a mass spectrum.

10. The method of claim 1, wherein the device having a mass transfer function that varies with ion current comprises a mass filter.

11. The method of claim 10, wherein guiding the generated ions through the mass filter comprises:

introducing at least two isotopes of interest for which the isotope ratio is to be determined;

setting a mass selection window of the mass filter to be centered around the masses of the isotopes of interest and to include the at least two isotopes of interest; and allowing ions with masses within the mass selection window to exit the mass filter such that the at least some of the ions provided to the mass analyzer are the ions allowed to exit the mass filter.

12. The method of claim 11, wherein the mass selection window is set such that a center mass value of the window is an average mass of the at least two isotopes of interest.

13. The method of claim 1, further comprising providing a selected ion current, wherein guiding the generated ions through the device having a mass transfer function that varies with ion current comprises guiding the generated ions through the device having a mass transfer function that varies with the selected ion current, or wherein providing at least some of the ions to the mass analyzer is performed based on the selected ion current.

14. The method of claim 1, wherein the mass analyzer comprises an orbital trapping mass analyzer.

15. A computing device for determining, based on mass spectrometry, an isotope ratio of ions from a source of ions, the computing device comprising:

a processing circuit; and a memory coupled to the processing circuit, wherein the memory comprises computer program instructions that, when executed by the processing circuit, cause the processing circuit to:

obtain a plurality of mass spectra of ions, wherein obtaining each mass spectrum of the plurality of mass spectra comprises:

generating ions from a first source of ions;

guiding the generated ions through a device having a mass transfer function that varies with ion current;

providing at least some of the ions to a mass analyzer;

obtaining, from the mass analyzer, a mass spectrum of the ions provided to the mass analyzer; and determining the ion current of the ions provided to the mass analyzer;

wherein the mass spectra are obtained for different measured ion currents;

determine an isotope ratio of ions provided to the mass analyzer from each mass spectrum;

determine, based on the determined isotope ratio and determined ion current for each mass spectrum, a calibration relationship that characterizes a variation of the determined isotope ratios and the measured ion currents across the mass spectra; and adjust, based on the calibration relationship, a measured isotope ratio obtained at a determined ion current to an adjusted isotope ratio corresponding to a selected ion current.

16. A mass spectrometer comprising:

a computing device for determining, based on mass spectrometry, an isotope ratio of ions from a source of ions;

a mass analyzer coupled to the computing device; and a device having a mass transfer function that varies with ion current coupled to the mass analyzer, wherein the computing device comprises:

a processing circuit; and a memory coupled to the processing circuit, wherein the memory comprises computer program instructions that, when executed by the processing circuit, cause the processing circuit to:

obtain a plurality of mass spectra of ions, wherein obtaining each mass spectrum of the plurality of mass spectra comprises:

generating ions from a first source of ions;

guiding the generated ions through the device having the mass transfer function that varies with ion current;

providing at least some of the ions to the mass analyzer;

obtaining, from the mass analyzer, a mass spectrum of the ions provided to the mass analyzer; and determining the ion current of the ions provided to the mass analyzer, wherein the mass spectra are obtained for different measured ion currents;

determine an isotope ratio of ions provided to the mass analyzer from each mass spectrum;

determine, based on the determined isotope ratio and determined ion current for each mass spectrum, a calibration relationship that characterizes a variation of the determined isotope ratios and the measured ion currents across the mass spectra; and adjust, based on the calibration relationship, a measured isotope ratio obtained at a determined ion current to an adjusted isotope ratio corresponding to a selected ion current.

17. A non-transitory computer readable storage medium comprising computer program instructions that, when executed by a computer, cause the computer to perform a method of determining, based on mass spectrometry, an isotope ratio of ions from a source of ions, the method comprising:

obtaining a plurality of mass spectra of ions, wherein obtaining each mass spectrum of the plurality of mass spectra comprises:

generating ions from a first source of ions;

guiding the generated ions through a device having a mass transfer function that varies with ion current;

providing at least some of the ions to a mass analyzer;

obtaining, from the mass analyzer, a mass spectrum of the ions provided to the mass analyzer; and determining the ion current of the ions provided to the mass analyzer, wherein the mass spectra are obtained for different measured ion currents;

determining an isotope ratio of ions provided to the mass analyzer from each mass spectrum;

determining, based on the determined isotope ratio and determined ion current for each mass spectrum, a calibration relationship that characterizes a variation of the determined isotope ratios and the measured ion currents across the mass spectra; and adjusting, based on the calibration relationship, a measured isotope ratio obtained at a determined ion current to an adjusted isotope ratio corresponding to a selected ion current.

18. The computing device of claim 15, wherein the program instructions are further executable for causing the processing circuit to:

generate ions from a second source of ions;

guide the ions generated from the second source of ions through the device having the mass transfer function that varies with ion current;

provide at least some of the ions generated from the second source of ions to the mass analyzer;

obtain, from the mass analyzer, a mass spectrum of the ions provided to the mass analyzer that were generated from the second source of ions;

determine the ion current of the ions provided to the mass analyzer that were generated from the second source of ions; and determine an isotope ratio of ions provided to the mass analyzer that were generated from the second source of ions from the mass spectrum.

19. The computing device of claim 15, wherein the program instructions are further executable for causing the processing circuit to:

obtain a plurality of mass spectra of ions from a second source of ions, wherein obtaining each mass spectrum of the plurality of mass spectra comprises:

generating ions from the second source of ions;

guiding the ions generated from the ions from the second source of ions through the device having the mass transfer function that varies with ion current;

providing at least some of the ions generated from the ions from the second source of ions to the mass analyzer;

obtaining, from the mass analyzer, a mass spectrum of the ions provided to the mass analyzer from the ions from the second source of ions;

determining the ion current of the ions provided to the mass analyzer from the ions from the second source of ions; and determining the isotope ratio of ions provided to the mass analyzer from the ions from the second source of ions from the mass spectrum;

determine, based on the determined isotope ratio and determined ion current for each mass spectrum obtained from the ions from the second source of ions, a sample calibration relationship that characterizes a variation of the determined isotope ratios and the measured ion currents across the mass spectra obtained from the ions from the second source of ions; and adjust, based on the calibration relationship determined for the ions from the second source of ions, a measured isotope ratio or ratios of the ions from the second source of ions to an adjusted isotope ratio for the ions from the second source of ions corresponding to the selected ion current used when adjusting the measured isotope ratio or ratios of the ions from the first source of ions.

20. The non-transitory computer readable storage medium of claim 17, wherein the method further comprises:

generating ions from a second source of ions;

guiding the ions generated from the second source of ions through the device having the mass transfer function that varies with ion current;

providing at least some of the ions generated from the second source of ions to the mass analyzer;

obtaining, from the mass analyzer, a mass spectrum of the ions provided to the mass analyzer that were generated from the second source of ions;

determining the ion current of the ions provided to the mass analyzer that were generated from the second source of ions; and determining an isotope ratio of ions provided to the mass analyzer that were generated from the second source of ions from the mass spectrum.

* * * * *